United States Patent
Subramanian et al.

(10) Patent No.: US 11,928,624 B2
(45) Date of Patent: Mar. 12, 2024

(54) SYSTEM AND METHOD FOR VALIDATING AVAILABILITY OF MACHINE AT WORKSITE

(71) Applicant: Caterpillar Inc., Peoria, IL (US)

(72) Inventors: Gautham Subramanian, Peoria, IL (US); Chad T. Brickner, Dunlap, IL (US); Mark William Whiting, Peru, IL (US)

(73) Assignee: Caterpillar Inc., Peoria, IL (US)

( * ) Notice: Subject to any disclaimer, the term of this patent is extended or adjusted under 35 U.S.C. 154(b) by 522 days.

(21) Appl. No.: 16/664,221

(22) Filed: Oct. 25, 2019

(65) Prior Publication Data
US 2021/0125123 A1    Apr. 29, 2021

(51) Int. Cl.
*G06Q 10/0631*    (2023.01)
*E02F 9/20*    (2006.01)
(Continued)

(52) U.S. Cl.
CPC ....... *G06Q 10/06313* (2013.01); *E02F 9/205* (2013.01); *E02F 9/2054* (2013.01);
(Continued)

(58) Field of Classification Search
CPC ....... G06Q 10/063114; G06Q 20/1085; G06Q 10/0635; G06Q 10/063; G06Q 10/10;
(Continued)

(56) References Cited

U.S. PATENT DOCUMENTS

| | | | |
|---|---|---|---|
| 6,587,768 B2 | 7/2003 | Chene et al. | |
| 6,952,680 B1 | 10/2005 | Melby et al. | |

(Continued)

FOREIGN PATENT DOCUMENTS

| | | |
|---|---|---|
| CN | 103228847 A | 7/2013 |
| CN | 104541299 A | 4/2015 |

(Continued)

OTHER PUBLICATIONS

S. Baumgart, et al. "Analyzing hazards in system-of-systems: Described in a quarry site automation context," 2017 Annual IEEE International Systems Conference (SysCon), Montreal, QC, Canada, 2017, pp. 1-8 <https://ieeexplore.ieee.org/document/7934783?source=IQplus> (Year: 2017).*

(Continued)

*Primary Examiner* — Jerry O'Connor
*Assistant Examiner* — Michael R Koester

(57) ABSTRACT

A worksite management system may include a worksite controller including one or more worksite controller processors configured to receive a signal indicative of a task to be performed by a machine at a worksite, identify a machine for performing the task, and generate a signal indicative of the machine. The worksite management system may also include a mobile device including one or more mobile device processors configured to receive the signal indicative of the machine, display an image representative of the machine, and display a prompt for a person at the worksite to validate availability of the machine to perform the task.

20 Claims, 11 Drawing Sheets

(51) Int. Cl.
  *E02F 9/26* (2006.01)
  *G05D 1/00* (2006.01)
  *G05D 1/02* (2020.01)
  *G06F 3/04815* (2022.01)
  *G07C 5/00* (2006.01)
  *G07C 5/08* (2006.01)

(52) U.S. Cl.
  CPC ........... *E02F 9/262* (2013.01); *G05D 1/0022* (2013.01); *G05D 1/0219* (2013.01); *G05D 1/0238* (2013.01); *G06F 3/04815* (2013.01); *G07C 5/006* (2013.01); *G07C 5/008* (2013.01); *G07C 5/0808* (2013.01)

(58) Field of Classification Search
  CPC ... G06Q 50/265; E02F 9/2054; G05D 1/0291; H04W 4/90; G06F 16/951
  See application file for complete search history.

(56) References Cited

U.S. PATENT DOCUMENTS

| | | | |
|---|---|---|---|
| 7,392,209 | B2 | 6/2008 | Shike et al. |
| 9,760,851 | B2 | 9/2017 | Ballew et al. |
| 2007/0179640 | A1 | 8/2007 | Moughler |
| 2012/0136507 | A1 | 5/2012 | Everett |
| 2013/0030876 | A1 | 1/2013 | Rinehart et al. |
| 2014/0277905 | A1* | 9/2014 | Anderson ...... G06Q 10/063114 701/29.3 |
| 2017/0076504 | A1* | 3/2017 | Oar ..................... H04L 41/0866 |
| 2017/0147958 | A1* | 5/2017 | Hatfield ......... G06Q 10/063114 |
| 2017/0314232 | A1 | 11/2017 | Chi |
| 2019/0162551 | A1 | 5/2019 | Kean |

FOREIGN PATENT DOCUMENTS

| | | | | |
|---|---|---|---|---|
| CN | 104699037 A | 6/2015 | | |
| CN | 107636702 A | 1/2018 | | |
| CN | 109840462 A | 6/2019 | | |
| DE | 102018218155 A1 * | 5/2019 | ............. | B64D 47/08 |
| EP | 2447905 A1 * | 5/2012 | ............. | G06Q 10/02 |
| WO | WO-2018232424 A1 * | 12/2018 | ............. | G06Q 10/08 |

OTHER PUBLICATIONS

Office Action in Chinese patent appln. No. 202080074380.7 (dated Dec. 1, 2023), 6 pgs.

* cited by examiner

SYSTEM AND METHOD FOR VALIDATING AVAILABILITY OF MACHINE AT WORKSITE

TECHNICAL FIELD

The present disclosure relates to a system and method for validating availability of a machine at a worksite, and more particularly, to a system and method for validating the availability of a machine at a worksite to perform a task at the worksite.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. A worksite plan may be developed and used to guide operators in managing, executing, and completing a number of tasks outlined within the worksite plan to achieve a desired result associated with the worksite. The worksite plan may include instructions for particular machines to perform corresponding tasks in a particular order in order to achieve a desired result at the worksite. Some worksites may include a combination of machines manually operated by a human operator using controls on-board the machine, semi-autonomous machines controlled with the assistance of a human operator, fully-autonomous machines capable of performing tasks without intervention of a human operator, and/or remotely-controlled machines at least partially controlled remotely by a human operator separated from the machine. Coordinating the tasks associated with the different machines according to the worksite plan may be complex and result in inefficiencies at the worksite. Moreover, with many machines operating at the worksite and performing a variety of tasks, it may be difficult to know whether certain machines are available to preform tasks at the worksite.

An attempt to provide integrated asset management is described in U.S. Pat. No. 9,760,851 B2 to Ballew et al. ("the '851 patent"), issued Sep. 12, 2017. Specifically, the '851 patent describes a system for integrated asset management. According to the '851 patent, information from a first reporting source and a second reporting source about an asset is received. Inspection information about the asset is received from a first enabled device, and a database is thereafter populated with the information from the first and second reporting sources and the inspection information from the first enabled device, such that the information from the first reporting source, the second reporting source, and the first enabled device can be collected or accessed in an integrated manner from the database for use by a client information system. According to the '851 patent, the method and system for asset management may utilize a plurality of disparate sources for monitoring an asset, and each disparate source may provide an asset report, which is populated in a database. According to the '851 patent, the database is organized to combine the plurality of asset reports, resulting in an organized single source of asset information that will provide a vast plethora of asset management data with a depth significantly greater than a single information source can provide.

Although the '851 patent purports to describe an asset management system and method that is able to provide asset information from a plurality of disparate sources, the '851 patent does not describe as system and method for validating the availability of a machine to perform a task at a worksite. The systems and methods described herein may be directed to addressing one or more of the possible concerns set forth above.

SUMMARY

According to a first aspect, a worksite management system may include a worksite controller including one or more worksite controller processors configured to receive a signal indicative of a task to be performed by a machine at a worksite. The one or more worksite processors may also be configured to identify a machine for performing the task and generate a signal indicative of the machine. The worksite management system may also include a mobile device including one or more mobile device processors configured to receive the signal indicative of the machine and display an image representative of the machine. The one or more mobile device processors may also be configured to display a prompt for a person at the worksite to validate availability of the machine to perform the task.

According to a further aspect, a method for validating availability of a machine to perform a task at a worksite may include receiving a signal indicative of a task to be performed by a machine at a worksite and identifying a machine for performing the task. The method may also include generating a signal indicative of the machine and communicating the signal to a mobile device. The method may further include displaying on the mobile device an image representative of the machine and displaying on the mobile device a prompt for a person at the worksite to validate availability of the machine to perform the task.

According to another aspect, a computer-readable storage medium having computer-executable instructions stored thereupon which, when executed by a computer, may cause the computer to receive a signal indicative of a task to be performed by a machine at a worksite and identify a machine for performing the task. The computer may be further configured to generate a signal indicative of the machine and communicate the signal indicative of the machine to a mobile device. The computer may be further configured to cause the mobile device to display on the mobile device an image representative of the machine and cause the mobile device to display on the mobile device a prompt for a person at the worksite to validate availability of the machine to perform the task.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
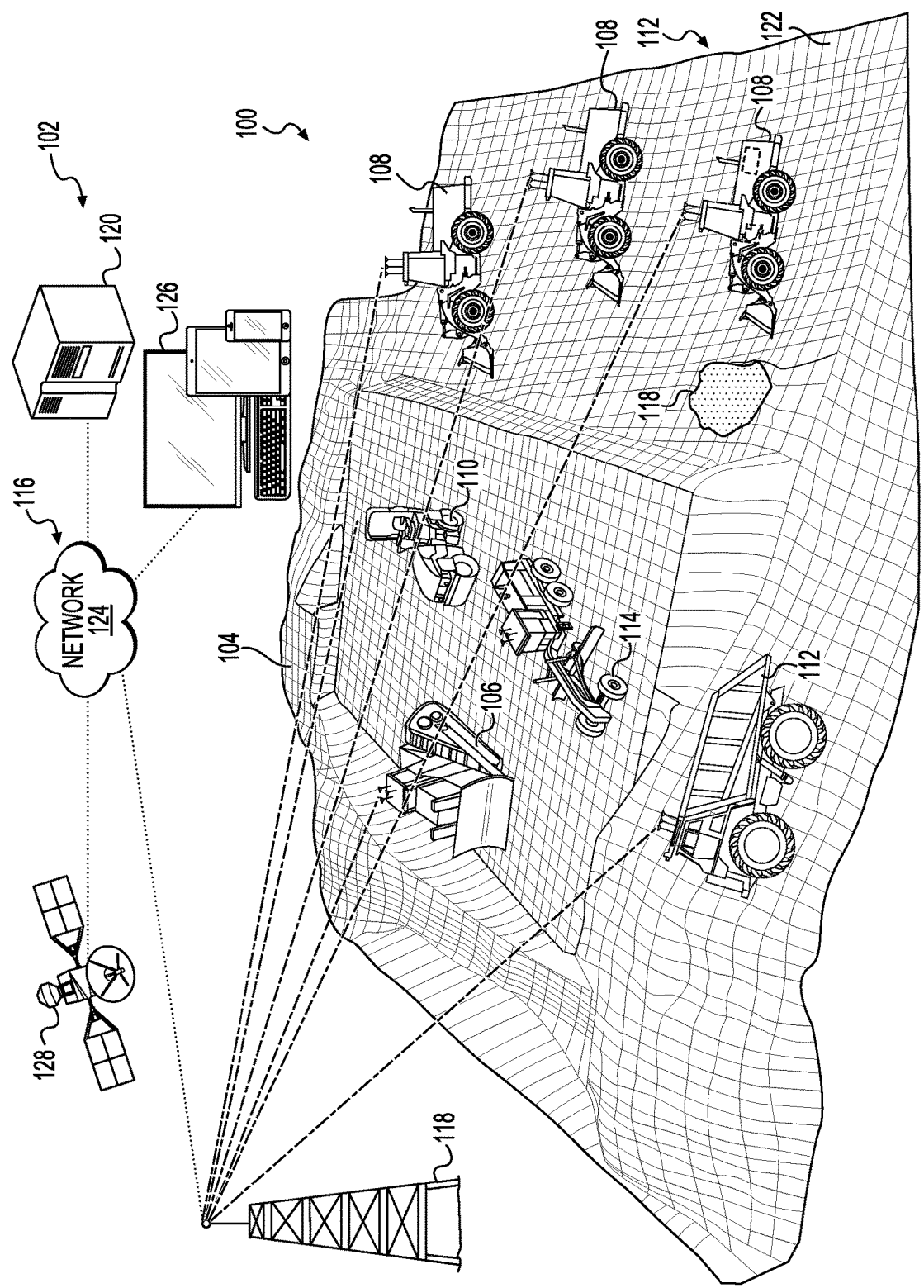
FIG. 1 is a schematic diagram showing an example worksite and an example worksite management system.

As noted herein, a worksite plan may be developed and used to guide operators and/or machines with managing, executing, and completing a number of tasks outlined within a worksite plan to achieve a desired result associated with the worksite. The worksite plan may include instructions for particular machines to perform corresponding tasks in a particular order in order to achieve a desired result at the worksite. However, in some examples, a worksite manager making decisions about assigning machines to perform particular tasks associated with a worksite plan may be at a non-line-of-site (NLOS) location relative to the worksite, and thus, may not be able to verify that one or more of the machines are actually available to perform the assigned tasks. For example, one or more of the machines assigned to perform a respective task may be unavailable to perform the task because, for example, it is already being operated to perform a different task and is thus currently unavailable to perform the assigned task. In some examples, one or more of the machines assigned to perform a respective task may be unavailable to perform the task because, for example, there is an obstruction on the worksite that will prevent the assigned machine from preforming the task. For example, the obstruction may include one or more other machines either parked or operating at a location that prevents the assigned machine from being able to perform its respective task. In some examples, the obstructions may include environmental obstacles, such as, for example, trees, a steep drop-off in the terrain, and/or some other obstacle that may prevent safe operation of the assigned machine. In some examples, one or more of the machines assigned to perform a respective task may be unavailable to perform the task because, for example, the assigned machine is not in a condition suitable to perform the assigned task. For example, the assigned machine may not have a work tool coupled to the machine appropriate for performing the assigned task. For example, the assigned task may include breaking-up rock or concrete, which may require a work tool including a hydraulic hammer. The assigned machine may be fitted with another work tool or bucket, and thus, the machine may need to be refitted with a hydraulic hammer before it will be able to perform the assigned task. In some examples, the assigned machine may not be available for performing the assigned task because it needs to be serviced or repaired before it will be able to perform the assigned task. For example, the assigned machine may have a flat tire, a frozen or broken track link, a missing work tool or part, a broken work tool or part, the assigned machine is not fully assembled (e.g., the work tool is not properly attached), there are apparent fluid leaks (e.g., fuel, hydraulic fluid, oil, and/or coolant leaks are apparent from the ground under the machine and/or on machine (e.g., fluid running down the side)), the machine is unable to start, there are warning lights/fault signals at the machine's operator controls, the machine does not have sufficient fuel to perform the assigned task, and/or the machine makes a strange sound at start-up.

The present description is generally directed to systems and methods for validating the availability of a machine to perform an assigned task. In some examples, the systems and methods may be configured to provide a person located at the worksite with the ability to validate the availability (including a lack of availability) of a machine selected from, for example, an NLOS location relative to the worksite to perform an assigned task. In some examples, the systems and methods may include a mobile device for use by a person at the worksite to validate the availability, for example, that may provide one or more prompts for facilitating the validation by the person and communicating the validation to a location remote form the worksite, such as, for example, the location of a worksite manager.

FIG. 1 is a schematic diagram showing an example worksite 100 and an example worksite management system 102 for managing operation of one or more machines for excavating, moving, shaping, contouring, and/or removing material associated with terrain 104 present at the worksite 100. Other types of worksites and/or machines are contemplated. In some examples, the worksite management system 102 may be configured to assist with developing and/or executing a worksite plan that may be used to guide operation of one or more of the machines at the worksite 100 to achieve a desired result associated with the worksite 100. In some examples, the worksite management system 102 may be configured to assist with creating the worksite plan and/or implementing the worksite plan from a non-line-of-sight (NLOS) location. For example, the worksite plan may be created to assist operators and other users in managing, executing, and completing a number of tasks outlined within the worksite plan. In some examples, the machines may include a combination of machines manually operated by a human operator using controls on-board the machine, semi-autonomous machines controlled with the assistance of a human operator, fully-autonomous machines capable of performing tasks without intervention of a human operator, and/or remotely-controlled machines at least partially controlled remotely by a human operator and/or one or more electronic controllers separated from the machine. In some examples, the worksite management system 102 may be configured to assist with validating the availability of one or more of the machines to perform one or more respective tasks associated with the worksite 100.

As shown in FIG. 1, the example worksite 100 may include one or more machines 106, 108, 110, 112, or 114 operating at the worksite 100 to perform various tasks associated with the worksite 100. For example, the worksite 100 may include one or more digging machines 106, one or more loading machines 108, one or more compacting machines 110, one or more hauling machines 112, one or more grading machines 114, and/or any other types of machines used, for example, for construction, mining, paving, excavation, and/or other operations at the worksite 100. One or more of the machines described herein may be in communication with each other and/or with a communication system 116 (e.g., a local and/or remote-control system) by way of one or more communications stations 118 (e.g., one or more communications towers including one or more transmitters, receivers, and/or transceivers configured to facilitate communications). In some examples, the one or more communications stations 118 may be configured to facilitate wireless communications between the one or more machines and, for example, a worksite controller 120 of the worksite management system 102, for the purpose of transmitting and/or receiving operational data and/or instructions related to, for example, performing tasks associated with the worksite 100.

The example digging machines 106 may include any machine that moves material at the worksite 100 for the purpose of subsequent operations (e.g., for blasting, loading, hauling, and/or other operations). For example, the digging machines 106 may include excavators, backhoes, dozers, drilling machines, trenchers, drag lines, and/or any other types of digging machines. Multiple digging machines 106 may be located within a common area at the worksite 100 and, in some examples, may perform similar functions. For example, one or more of the digging machines 106 may move soil, sand, minerals, gravel, concrete, asphalt, overburden, and/or other material including at least part of a work surface 122 of the terrain 104 of the worksite 100.

The example loading machines 108 may include any machine that lifts, carries, loads, and/or removes material, for example, that has been moved or reduced by one or more of the digging machines 106. In some examples, the one or more loading machines 108 may be configured to remove such material and/or may transport the removed material from a first location at the worksite 100 to second location at the worksite 100 or off, or onto, the worksite 100. Examples of loading machines 108 may include a wheeled- or tracked-loader, a front shovel, an excavator, a cable shovel, a stack reclaimer, and/or any other types of loading machines. One or more of the loading machines 108 may operate within common areas of worksite 100, for example, to load material onto one or more hauling machine 112.

The example compacting machines 110 may include any machine that is configured to apply stress on the work surface 122 of the terrain 104 of the worksite 100 and cause densification of soil, concrete, asphalt, and/or other materials thereon, and/or to obtain an acceptable surface finish. In some examples, operation of the one or more compacting machines 110 may follow operation of one or more grading machines 114 and/or may precede operation of a grading machine 114. In some examples, a compacting process may be performed with one or more compacting machines 110, such as, for example, double-drum compacting machines, having a front drum and a rear drum, which may serve to propel the machine and compact the material to a suitable state via the weight of the one or more compacting machines 110. Some examples may be used in cooperation with drum vibrating apparatuses. Other examples of compacting machines 110 may include a wheeled- or tracked-compactor, a vibratory compactor, and a tandem vibratory compactor, and/or other types of compacting machines. In some examples, one or more of the compacting machines 110 may include a soil compacting machine configured to compact soil or other materials located on the work surface 122 of the worksite 100. Although other materials may be compacted using one or more compacting machines 110, the examples described herein are described in connection with soil compaction.

The example hauling machines 112 may include any machines that carry materials (e.g., excavated materials) between different locations within the worksite 100 and/or to another location remote from the worksite. Examples of hauling machines 112 may include an articulated truck, an off-highway truck, an on-highway dump truck, a wheel tractor scraper, and/or any other type of hauling machines. Hauling machines 112 may carry, for example, overburden from areas of excavation within the worksite 100, for example, along haul roads to various dump sites, and return to the same or different excavation areas for repeated loading.

The example grading machines 114 may include any machine configured to create a substantially flat surface by grading material, such as soil at the worksite 100, for example, for subsequent operations, including a compacting operation. Examples of grading machines 114 may include scrapers, dozers, motor graders, and/or any other types of machines configured to create a flat surface during operation.

As shown in FIG. 1, the example worksite management system 102 includes the worksite controller 120 configured to control and/or coordinate operations between various assets (machine and/or human) associated with the worksite 100. In some examples, the worksite controller 120 may be located at a command center, for example, remote from the worksite 100. In some examples, the worksite controller 120 may be located at the worksite 100. The worksite controller 120 may be may configured to facilitate communications between, and to provide information to, the one or more digging machines 106, the one or more loading machines 108, the one or more hauling machines 110, the one or more compacting machines 112, the one or more grading machines 114, and/or other machines of the worksite 100. In some examples, the functionality of the worksite controller 120 may be distributed, for example, so that certain operations may be performed at the worksite 100 and other operations may be performed remotely from the worksite, such as, for example, at a remote command center. For example, at least some operations of the worksite controller 120 may be performed at the worksite 100, on the one or more digging machines 106, on the one or more loading machines 108, on the one or more hauling machines 110, on the one or more compacting machines 112, on the one or more grading machines 114, and/or on other machines of the worksite 100, among other locations and devices of the worksite 100. In some examples, the worksite controller 120 may include a component of the worksite 100, a component of one or more of the machines located at the worksite 100, a component of a separate mobile device, such as, for example, a mobile phone, a tablet, and/or a laptop computer, among other types of mobile devices.

The worksite controller 120 may be an electronic controller that operates in a logical fashion to perform operations, execute control algorithms, store and retrieve data, and/or other desired operations. The worksite controller 120 may include and/or access memory, secondary storage devices, processors, and/or any other components for running an application. The memory and secondary storage devices may be in the form of read-only memory (ROM) or random-access memory (RAM) or integrated circuitry that is accessible by the worksite controller 120. Various other circuits may be associated with the worksite controller 120, such as, for example, power supply circuitry, signal conditioning circuitry, driver circuitry, and/or other types of circuitry.

The worksite controller 120 may include a single controller or may include more than one controller. In at least some examples where the worksite controller 120 includes more than one controller, the worksite controller 120 may, for example, include additional controllers associated with each of the digging machines 106, loading machines 108, hauling machines 110, compacting machines 112, grading machines 114, and/or other machines of the worksite 100. The additional controllers, in some examples, may be configured to control various functions and/or features of the worksite 100. One or more of the controllers may include one or more processors, central processing units, and/or microprocessors that may be associated with the worksite 100, and/or that may cooperate in controlling various functions and operations of the machines included in the worksite 100. The functionality of the worksite controller 120 may be implemented in hardware and/or software, for example, without regard to the functionality. The worksite controller 120 may rely on one or more data maps, look-up tables, neural networks, algorithms, machine learning algorithms, machine-learning-trained algorithms, and/or other components relating to the operating conditions and the operating environment of the worksite 100 that may be stored in the memory of the worksite controller 120, and/or which may be accessible to the worksite controller 120. At least some of the data maps, look-up tables, neural networks, and/or other components noted above may include a collection of data in the form of tables, graphs, and/or equations, for example, to improve and/or maximize the performance and efficiency of the worksite 100 and/or its operation.

The components of the worksite management system 102 may be in communication with and/or otherwise operably coupled to any of the components of the worksite 100 via, for example, one or more networks 124. The one or more networks 124 may include a local area network (LAN), a larger network, such as a wide area network (WAN), and/or a collection of networks, such as the Internet. Protocols for network communication, such as, for example, TCP/IP, may be used to implement the one or more networks 124. In some examples, the one or more networks 124 may include other distribution techniques that transmit information via memory cards, flash memory, and/or other portable memory devices.

In some examples, one or more of the machines of the worksite 100 may include respective controllers, and one or more of the respective controllers (including the worksite controller 120) may be in communication with and/or may otherwise be operably connected via the one or more networks 124. For example, the one or more networks 124 may include a component of a wireless communication system of the worksite management system 102, and as part of such a wireless communication system, one or more of the machines of the worksite 100 may include respective communication devices (e.g., transmitters, receivers, and/or transceivers). Some such communication devices may be configured to permit wireless transmission of a plurality of signals, instructions, and/or information between the worksite controller 120 and/or one or more of the respective controllers of the machines. Some such communication devices may also be configured to permit communication with other machines and systems remote from the worksite 100. For example, such communication devices may include a transmitter configured to transmit signals (e.g., via the communication system 116 and/or the one or more communications stations 118, for example, via the one or more networks 124) to a receiver of one or more other such communication devices. In some such examples, one or more of the communication devices may also include a receiver configured to receive such signals (e.g., via the communication system 116 and/or the one or more communications stations 118, for example, via the one or more networks 124). In some such examples, the transmitter and the receiver of the communication device may be combined as a transceiver or other component having similar capabilities. In some examples, the respective controllers associated with the machines of the worksite management system 102 may be substantially similar to and/or the same as the worksite controller 120, and/or may include one or more of the same or similar components thereof.

In at least some examples, the communication devices associated with the machines may enable communication (e.g., via the communication system 116 and/or the one or more communications stations 118, for example, via the one or more networks 124) with one or more mobile devices including, for example, tablets, computers, cellular/wireless telephones, personal digital assistants, and/or other electronic devices 126 located at the worksite 100 and/or remote from the worksite 100. Some such electronic devices 126 may include, for example, mobile devices, such as, for example, mobile phones and/or tablets of project managers (e.g., foremen or supervisors) that may supervise operations at the worksite 100 or at a non-line-of-sight (NLOS) location with respect to the worksite 100. As used herein, the term "non-line-of-sight" or "NLOS" is meant to be understood broadly and may refer to any location with respect to the worksite 100 that is obstructed by a physical object, for example, such that light and/or electromagnetic waves cannot propagate between the location and the worksite 100. In some examples, the NLOS location may include a cloud network that provides data storage and computing power sufficient to perform at least some of the example functions described herein. As used herein, the term "line-of-sight" or "LOS" is meant to be understood broadly and may refer to any location with respect to the worksite 100 that is not obstructed by a physical object, for example, such that light and/or electromagnetic waves may propagate between the location and the worksite 100. For example, an NLOS location may be a remote location with respect to the worksite 100 from which an intermediary communication device, such as, for example, the communication system 116 and/or the one or more communications stations 118, may be used to transmit signals between the remote location and the worksite 100, for example, where direct transmission between the remote location and the worksite 100 is not possible. In some examples, the communication system 116 may include one or more communication satellites 128. In some such examples, inclusion of satellite communications provided via, for example, the one or more communications satellites 128, an NLOS location may range from, for example, several miles to half the circumference of the terrestrial body (e.g., the earth) on which the worksite management system 102 is operating with respect to the worksite 100. In some examples, a remotely-located operator may manually and/or semi-autonomously remotely operate the machines, for example, by communicating signals from a computing device, such as, for example, the worksite controller 120, an electronic device 126, and/or another remotely-located computing device to the worksite 100 via the one or more communications satellites 128, the communication system 116, the one or more communications stations 118, and/or the one or more networks 124.

As used herein, the term "remote" is meant to be understood broadly and may refer to being located away from the worksite 100. Although a remote location may be within line-of-site of the worksite 100, remote as used herein may refer to a location at which a computing device, such as the worksite controller 120, an electronic device 126, and/or another remotely-located computing device is not at, or on, the worksite 100 and may use intermediary communication devices, such one or more of the communications satellites 128, the communication system 116, the one or more communications stations 118, and/or the one or more networks 124 to communicate signals to the worksite 100. As used herein, "local" is meant to be understood broadly and may refer to being located at, or on, the worksite 100.

The one or more networks 124, communication electronic devices 126, and/or other components of a wireless communication system may implement or utilize any desired system or protocol, including any of numerous communications standards. The protocols may permit communication between the worksite controller 120, the electronic devices 126, one or more of the communication devices associated with the machines, and/or any other desired machines or components of the worksite management system 102. Examples of wireless communications systems or protocols that may be used by the worksite management system 102 described herein may include a wireless personal area network, such as, for example, Bluetooth®. (e.g., IEEE 802.15), a local area network, such as, for example, IEEE 802.11b and/or 802.11g, a cellular network, and/or any other system or protocol for data transfer. Other wireless communication systems and configurations are contemplated. In some examples, wireless communications may be transmitted and/or received directly between the worksite controller 120 and/or one or more of the machines of the worksite 100 and/or between such machines. In some examples, communications may be automatically routed without the need for re-transmission by remote entities.

One or more machines of the worksite 100 may include a location sensor configured to generate one or more signals indicative of a location, speed, heading, and/or orientation of the respective machine. In some such embodiments, the communication device associated with the respective machine may be configured to generate and/or transmit signals indicative of such determined locations, speeds, headings, orientations, haul distances, and/or area covered, to, for example, the worksite controller 120 and/or to other respective machines of the worksite 100, for example, as detected by the respective location sensor. In some examples, location sensors of the respective machines may include a component (e.g., a receiver) of a global navigation satellite system (GNSS) and/or a global positioning system (GPS). In some examples, universal total stations (UTS) may be used to locate positions of respective machines. In some examples, one or more of the location sensors described herein may include a GPS receiver, a transmitter, a transceiver, laser prisms, and/or other such devices, and the location sensor may be in communication with one or more communications satellites 128 and/or UTS to determine a respective location of the machine to which the location sensor is coupled continuously, substantially continuously, or at various time intervals. One or more additional machines of the worksite 100 may also be in communication with the one or more communications satellites 128 and/or UTS, and such communications satellites 128 and/or UTS may also be configured to determine locations of such additional respective machines. In some examples, machine locations, speeds, headings, orientations, and/or other parameters determined by the respective location sensors may be used by the worksite controller 120 and/or other components of the worksite management system 102 to coordinate activities of the one or more machines and/or other components of the worksite 100.

The communications satellites 128 and/or UTS may be used to receive machine data from one or more of the machines of the worksite 100. The communications satellites 128 and/or UTS may be used to transmit machine data to the worksite controller 120 and/or other data processing devices or systems within the worksite management system 102. The machine data may be obtained by a number of sensors coupled to the one or more machines, processed by a controller associated with a respective machine, and transmitted to other computing devices, such as the worksite controller 120, the electronic devices 126, and/or other data processing devices within the worksite management system 102. In some examples, one or more of the machines may include a plurality of sensors used to generate one or more signals indicative of one or more of a plurality of different environmental parameters associated with the respective machines. The sensors may be configured to generate signals indicative of one or more of numerous environmental parameters, such as, for example, light, motion, temperature, magnetic fields, electrical fields, gravity, velocity, acceleration in any number of directions, humidity, moisture, vibration, pressure, and/or sound, among other environmental parameters. Thus, the sensors may include accelerometers, thermometers, proximity sensors, electric field proximity sensors, magnetometers, barometers, seismometers, pressure sensors, and/or acoustic sensors, among other types of sensors. Corresponding data associated with the type of sensor may be collected and/or stored. In some examples, data obtained via the sensors may be communicated to the controller of a respective machine for further communication and/or processing.

The machine data may include machine telematics data that may include, for example, a location of the machine, utilization data that defines the manner, location, duration, and/or functions used by the machine, a specification associated with the machine, the health of the machine, the data obtained from the sensors associated with the machine, and/or other telematics data. As used herein, "telematics" may refer to the measuring, transmitting, and/or receiving of data defining a value of a quantity at a distance, by electrical translating, such as, for example, a wired or wireless communication network including the one or more networks 124. In at least some examples, the telematics data may include data associated with progress with regard to a level of completion of tasks by the one or more machines and/or the worksite plan, and may be presented as, for example, progress indicators sometimes referred to as "key progress indicators" (KPIs). In some examples, the worksite plan may include a boundary of the worksite 100 at which the worksite plan is implemented. In some examples, the worksite plan may include at least one task including mission parameters at least partially defining the worksite plan. The mission parameters may include, for example, instructions to the machines identifying actions to be taken to fulfill the tasks, such as, for example, a work area at which the task is to be performed, a number of interactive actions the machine is to take with regard to the material of the worksite 100, such as, for example, a number of loads to haul, a number of passes to make, among other machine-specific mission parameters. The mission parameters may also include a time and/or date by which the task is to be completed or a scheduled time at which one or more actions associated with the task may be performed. The worksite plan may also include at least one machine parameter that defines one or more dimensions and/or capabilities of the respective machines. For example, the machine parameters may include sizes of one or more work tools and/or other material-moving implements associated with a respective machine, an indication of the manual, autonomous, and/or remote control capabilities associated with a respective machine and/or whether these capabilities are available for the respective machines, the type of fuel consumed by the respective machines, the physical dimensions of the respective machines, and/or other machine parameters that may be useful for determining the tasks of the worksite plan to assign to particular machines and/or the type of operation mode to assign to the particular machines.

In some examples, progress indicators (PIs) may be associated with respective tasks and may include any type of measurement used to evaluate a level or percentage of completion of a project, such as, for example, the tasks executed by the respective machines associated with the worksite plan. In some examples, the telematics data may include data obtained from sensors associated with respective machines. For example, the telematics data may include data related to detection of an obstacle within the worksite 100 and/or along a work surface 122 of the worksite 100. In some examples, data related to detection of an obstacle may be obtained from a sensor associated with a machine, such as, an imager, a light detection and ranging (LIDAR) sensor, a radio detection and ranging (RADAR) sensor, a sound navigation and ranging (SONAR) sensor, combinations thereof, and/or sensors and technologies used to detect objects in space. The controllers of the respective machines may be used along with the sensors to execute obstacle detection software to identify and/or classify objects included in sensor data obtained from the sensors. The telematics data may include data related to the worksite plan. For example, the telematics data may include data sent from, for example, the worksite controller 120 of the worksite management system 102, the electronic devices 126, and/or other data processing devices within the worksite management system 102. In some examples, the telematics data may include a unique identifier for each of the machines, such as, for example, a license plate number, a vehicle identification number, and a media access control (MAC) address associated with controllers associated with the respective machines, and/or electronic devices 126 of the respective machines, among other types of unique identifiers. In some examples, a unique identifier may be assigned to one or more of the machines and stored in memory, such as memory associated with the worksite controller 120 and/or the controller of the respective machine.

The one or more machines may be operated semi- and/or fully-autonomously. As used herein, the term "autonomous" may be understood broadly and may refer to any operation that is completely automatic or substantially automatic, for example, without significant human involvement in the machine operation. An autonomous vehicle (e.g., the machines 106, 108, 110, 112, and/or 114) may be generally be unmanned (e.g., un-piloted). In some examples, an autonomous vehicle may be maneuvered or otherwise operated automatically and may have one or more human passengers. Similarly, as used herein, the term "semi-autonomous" may be understood broadly and may refer to any operation that is at least partially automatic and/or at least partially brought about by human involvement in the operation, for example, with at least some human involvement in the operation. A semi-autonomous vehicle (e.g., the machines 106, 108, 110, 112, and/or 114) may be unmanned (e.g., un-piloted) and/or may be manned with a human pilot or co-pilot. In some examples, the semi-autonomous vehicle may be manned by at least one individual at the worksite, such as, for example, at a line-of-site location and/or within the respective machine, and/or manned by an individual remotely operating the machine from an NLOS location.

In some examples, one or more of the machines may report production metrics of various types. For example, the worksite controller 120, the electronic devices 126, one or more of the communication devices of the machines, and/or any other machines and/or components of the worksite 100 may continuously or periodically send requests to the respective communication devices of the machines requesting data obtained from the sensors of the machines, and/or data associated with the progress indicators may be transmitted to the machines and/or components of the worksite 100. In some examples, the sensors of the machines may sense the environment, and signals including the sensor data may be continuously or periodically transmitted to the worksite controller 120, the electronic devices 126, one or more of the communication devices of the machines, and/or any other desired machines and/or components of the worksite 100 via the communication devices of the machines and/or the controllers of the machines. In some examples, the sensors of the machines may sense the environment, and data including the sensor data may be stored in, for example, data storage devices associated with the communication devices of the machines, the controllers of the machines, the worksite controller 120, the electronic devices 126, and/or any other machines and/or components of the worksite 100.

One or more of the machines may report production metrics in the form of progress indicators (PIs) of different types. For example, truck loads delivered by the machines and/or a final grade (e.g., via grade control, manual survey, and/or drone flight) of the worksite 100 may be measured to determine progress of the individual tasks within the worksite plan, such as, for example, a mass excavation project that utilizes a plurality of different machines. In some examples, the PIs may be used to identify underperforming machines within the worksite plan and/or to allow supervisors, foremen, managers, crew members, and/or other individuals associated with the worksite plan to know the progress relative to the worksite plan. In some examples, the PIs may be presented on a user interface on, for example, the display devices of the electronic devices 126, a display device associated with the worksite controller 120, and/or other display devices associated with the worksite 100. Users, such as the supervisors, managers, crew members, and/or other individuals associated with the worksite plan may understand one or more of the individual production metrics, for example, as defined by the PIs as they relate to the tasks and the overall worksite plan. Data sensed by the sensors of the machines may be transmitted from the machines, and may be processed by, for example, the worksite controller 120 using one or more data maps, look-up tables, neural networks, algorithms, machine learning algorithms, and/or other components to present the data as PIs to the users. In some examples, the respective machines may execute their respective tasks within the worksite plan independently. In some examples, two or more of the machines may operate cooperatively to execute and complete tasks and the worksite plan. In some such examples, the PIs may be communicated as individual sets of data from respective machines, the PIs may be grouped together as groups of machines collect data from their respective sensors, and/or the PIs may be grouped together based on machine being similar to, or identical to, one another.

As noted above, one or more of the machines may include a controller. The machine controllers may include a component of a local control system on-board and/or otherwise carried by the respective machine. The machine controllers may include any embedded system within the respective machine that controls at least one of the electrical systems or subsystems of the respective the machine, and thus, at least one function of the respective machine. Some examples of such machine controllers may be generally similar or identical to the worksite controller 120 of the worksite management 102. For example, one or more of the machine controllers may include one or more processors, a memory, and/or other components described herein with respect to the worksite controller 120. The machine controllers, in some examples, may include an ECU, such as, for example, an electronic control module (ECM), a powertrain control module (PCM), a transmission control module (TCM), a brake control module (EBCM), a central control module (CCM), a central timing module (CTM), a general electronic module (GEM), a body control module (BCM), a suspension control module (SCM), a control unit, and/or any other types of ECUs. The ECUs may include hardware and embedded software that assist in the operation of the machines.

In some examples, a machine controller may be located on a respective one of the machines and/or may include components located remotely from the respective machine, such as on any of the other machines of the worksite 100 and/or at the command center. Thus, in some examples, the functionality of the machine controllers may be distributed, for example, so that certain functions may be performed on the respective machine, and other functions may be performed remotely relative to the machine. In some examples, a machine controller of the local control system carried by a respective machine may enable autonomous and/or semi-autonomous control of the respective machine, either alone or in combination with the worksite controller 120. In some such examples, the machine controller carried by a respective machine may instruct a respective communication devices and/or location sensors to function as described herein and as directed by, for example, the worksite controller 120.

In some examples, one or more machines of the worksite 100 may include one or more implements and/or work tools coupled to the machine (e.g., to a chassis or frame of the machine). For example, for a loading machine 108, a work tool may include a bucket configured to gather, lift, and/or carry material from the worksite 100, for example, within an open volume or other substantially open space. Some loading machines 108 may be configured to, for example, scoop, lift, and/or load material (e.g., material removed by one or more digging machines 106) into the work tool by lowering the work tool to a loading position. For example, a loading machine 108 may include one or more linkages pivotally coupled to the chassis or frame of the loading machine 108. The work tool may be coupled to such linkages, and the linkages may be configured to lower the work tool (e.g., via one or more hydraulic cylinders, electronic motors, and/or other actuators coupled thereto) to a loading position in which a leading edge of the work tool is disposed proximate, adjacent, and/or at the work surface 122, and a base of the work tool may be moved to a position substantially parallel to the work surface 122. Some loading machines 108 may thereafter be controlled to advance along the surface of the work surface 122 of the worksite 100, such that the work tool may impact the material and/or other object disposed on the work surface 122, so as to partially transfer the material into an open space of the work tool. The linkages may thereafter be controlled to raise, pivot, and/or tilt the work tool to a carrying position above the work surface 122. The loading machine 104 may thereafter be controlled to maneuver on the worksite 100, for example, until the loading machine 108 reaches a dump zone, a hauling machine 112, and/or another location at the worksite 100 designated for receiving the removed material carried by the work tool. The linkages may thereafter be controlled to lower, pivot, and/or tilt the work tool to an unloading position in which the material carried by the work tool may be deposited (e.g., due to the force of gravity acting on the material carried by the work tool) within a bed of a hauling machine 112, and/or as otherwise desired. In some examples, one or more of the digging machines 106, one or more of the compacting machines 110, one or more of the hauling machines 112, and/or one or more of the grading machines 114 may include one or more work tools and/or linkages configured to perform one or more operations associated with the respective machine type.

Figure 2:
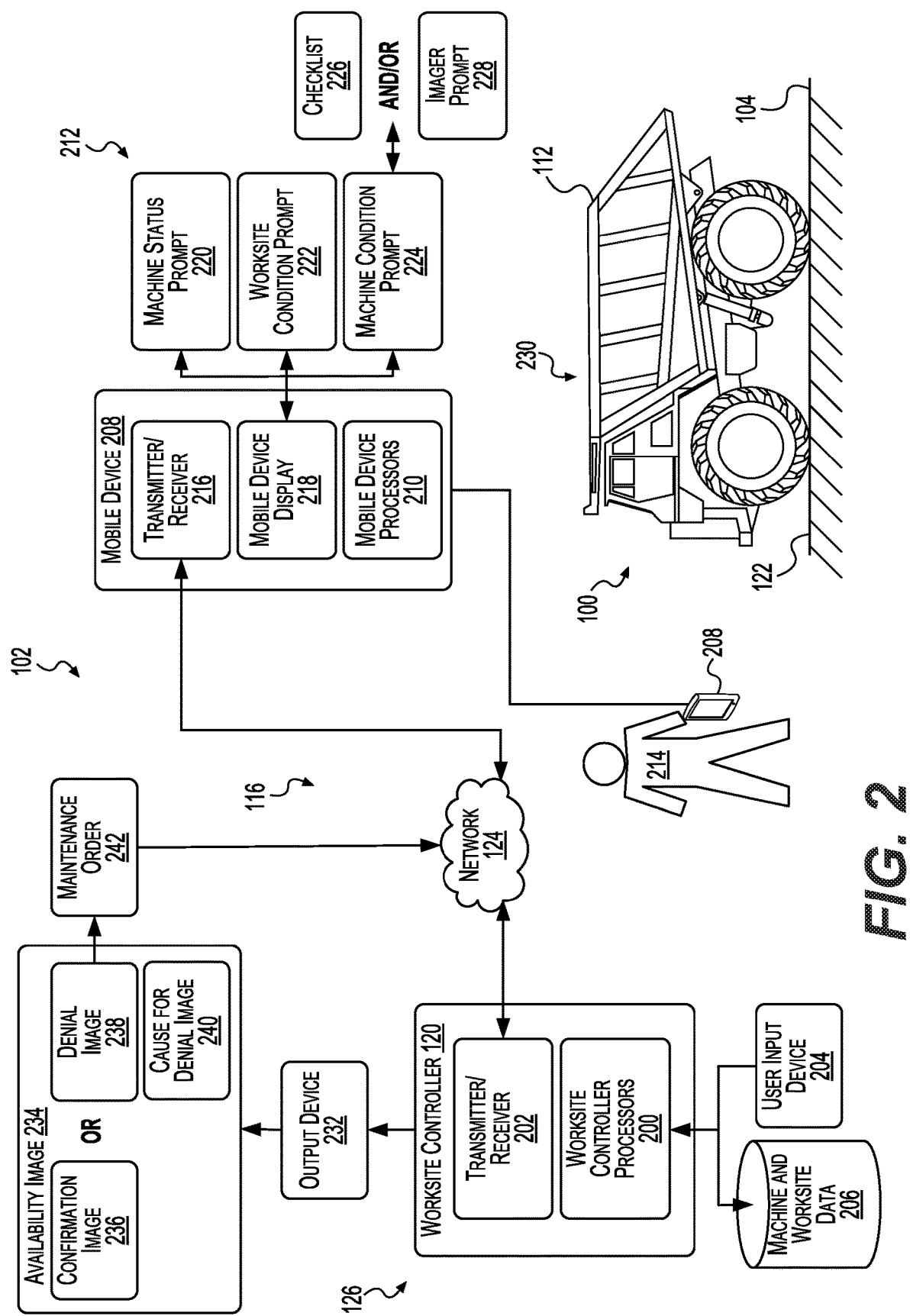
FIG. 2 is a schematic diagram showing an example worksite management system consistent with the example shown in FIG. 1.

FIG. 2 is a schematic diagram showing an example worksite 100 and an example worksite management system 102 consistent with the example worksite management system 102 shown in FIG. 1. As shown in FIG. 2, the example worksite management system 102 may include a worksite controller 120 consistent with the worksite controller shown in FIG. 1. As shown in FIG. 2, the worksite controller 120 may include one or more worksite controller processors 200 and a transmitter/receiver 202 (e.g., a transmitter, a receiver, and/or a transceiver) configured to communicate and/or receive signals associated with the worksite management system 102, for example, via the one or more networks 124. In some examples, the worksite controller 120 may be configured to receive one or more signals indicative of one or more tasks to be performed by one or more machines (e.g., one or more of the machines 106, 108, 110, 112, or 114 shown in FIG. 1), identify one or more machines for performing the one or more tasks, and generate one or more signals indicative of the one or more machines and/or the one or more respective tasks. For example, as shown in FIG. 2, the worksite management system 102 may include a user input device 204 (e.g., a keyboard, a voice-entry device, etc.), and a person, such as, for example, a worksite manager and/or other personnel associated with the worksite 100, may cause entry of at least a portion of a worksite plan via the user input device 204, and one or more signals associated with the worksite plan may be communicated to the worksite controller 120. In some examples, the worksite manager and/or other personnel may be located at an NLOS location. The one or more worksite controller processors 200 may be configured to identify one or more machines and/or one or more tasks to be performed by the respective one or more machines. In some examples, the one or more worksite controller processors 200 may be configured to access (e.g., communicate with) a database including memory for storing machine and worksite data 206, which may include one or more of the data types related to the worksite 100, the worksite management system 102, the machines, the terrain 104, the communication system 116, the work surface 122, the one or more networks 124, etc., discussed herein, and facilitate identifying one or more machines for performing the one or more tasks associated with the one or more signals received from the user input device 204.

As noted herein, although the worksite controller 120 may receive communications associated with one or more of the machines, for example, as described above, it may be difficult to determine, based on the communications, whether one or more of the machines is available to perform the one or more respective tasks assigned via the worksite management system 102. For example, one or more of the machines assigned to perform a respective task may be unavailable to perform the task because, for example, it is already being operated to perform a different task and is thus currently unavailable to perform the assigned task. In some examples, one or more of the machines assigned to perform a respective task may be unavailable to perform the task because, for example, there is an obstruction on the worksite 100 that will prevent the assigned machine from preforming the task. For example, the obstruction may include one or more other machines either parked or operating at a location that prevents the assigned machine from being able to perform the respective task. In some examples, the obstructions may include environmental obstacles, such as, for example, trees, a steep drop-off in the terrain, and/or some other obstacle may prevent safe operation of the assigned machine. In some examples, one or more of the machines assigned to perform a respective task may be unavailable to perform the task because, for example, the assigned machine is not in a condition suitable to perform the assigned task. For example, the assigned machine may not have a work tool coupled to the machine appropriate for performing the assigned task. For example, the assigned task may include breaking-up rock or concrete, which may require a work tool including a hydraulic hammer. The assigned machine may be fitted with a different work tool or bucket, and thus, the machine may need to be refitted with a hydraulic hammer before it will be able to perform the assigned task. In some examples, the assigned machine may not be available for performing the assigned task because it needs to be serviced or repaired before it will be able to perform the assigned task. For example, the assigned machine may have a flat tire, a frozen or broken tack link, a missing work tool or part, a broken work tool or part, the assigned machine is not fully assembled (e.g., the work tool is not properly attached), there are apparent fluid leaks (e.g., fuel, hydraulic fluid, oil, and/or coolant leaks are apparent from the ground under the machine and/or on machine (e.g., fluid running down the side)), the machine is unable to start, there are warning lights/fault signals at machine's operator controls, the machine does not have sufficient fuel to perform the assigned task, and/or the machine makes a strange sound at start-up.

As a result, it may be desirable to verify or validate that the one or more machines assigned to perform a task associated with the worksite 100 are available to perform the assigned task. As shown in FIG. 2, some examples of the worksite management system 102 may include a mobile device 208 including one or more mobile device processors 210 configured to receive one or more signals indicative of a machine selected for performing one or more tasks associated with the worksite 100 and display an image 212 representative of the selected machine and/or a prompt for a person 214 at the worksite 100 to validate availability of the machine to perform the task. The mobile device 208 may include any known mobile computing device, such as, for example, tablets, computers, cellular/wireless telephones, personal digital assistants, and/or computers, other electronic devices, etc. In some examples, as shown in FIG. 2, the mobile device 208 may include a transmitter/receiver 216 (e.g., a transmitter, a receiver, and/or a transceiver) configured to communicate and/or receive signals via the communication system 116, for example, via the one or more networks 124. In some examples, the transmitter/receiver 216 of the mobile device 208 may receive one or more signals from the worksite controller 120 indicative of one or more machines assigned to perform one or more tasks associated with the worksite 100 and/or indicative of the one or more tasks. The mobile device 208, in some examples, may include a mobile device display 218 configured to display one or more images representative of an assigned machine and, in at least some examples, a prompt for a person located in the vicinity of the assigned machine (e.g., a LOS location) to validate the availability of the assigned machine to perform the assigned one or more tasks.

For example, as schematically shown in FIG. 2, the prompt may include one or more of a machine status prompt 220 configured, for example, to facilitate validation that the assigned machine is not currently in use, a worksite condition prompt 222 configured, for example, to facilitate validation that no obstructions preventing operation of the assigned machine are present at the worksite 100, or a machine condition prompt 224 configured, for example, to facilitate validation that the machine is in a condition suitable for performing the assigned one or more tasks. As shown in FIG. 2, some examples of the machine condition prompt 224 may include a checklist prompt for prompting the person 214 to select between responding to the machine condition prompt 224 via a checklist 226 of machine condition parameters associated with a state of readiness of a plurality of parts of the machine for validation by the person 214 and/or via an imager prompt 228 prompting the person to generate a plurality of images of one or more of a plurality of the parts of the machine or portions of an environment in which the machine sits. In some examples, a combination the checklist 226 and the imager prompt 228 may be used to perform the validation. In some examples, the machine condition prompt 224 may be tailored to the characteristics of the machine being validated. For example, for a digging machine 106, one or more of the prompts may be related to a bucket (e.g., the presence of the bucket or its condition) of the digging machine 106, as compared to a grading machine 114, for which one or more of the prompts may relate to a blade (e.g., the presence of the blade or its condition) of the grading machine 114. Based on the one or more prompts, the person 214 located at the machine on the worksite 100 may validate whether the assigned machine is available to perform the one or more assigned tasks. In some examples, this may be configured to assist with implementing a worksite plan from an NLOS location by leveraging the presence of one or more people at the worksite 100, for example, at a location on the worksite 100 of the assigned machine.

As shown in FIG. 2, the example person 214 is located at the worksite 100 in the vicinity of an example machine 230, which may include any of the example machines described herein, as well as other types of machines configured to perform the same or other tasks. In some examples, based on the one or more prompts displayed by the mobile device display 218, the person 214 may validate the availability of the machine 230 to perform the one or more tasks associated with the worksite 100. For example, as described with respect to FIGS. 3-8, the person 214 may, based on the one or more prompts, determine whether the machine 230 is in use, and thus is unavailable to perform the one or more assigned tasks, determine whether obstructions at the worksite 100 prevent the machine 230 from performing the one or more assigned tasks, and thus the machine 230 is unavailable to perform the one or more assigned tasks, and/or to determine whether the machine 230 is in a condition that would prevent or impair the ability of the machine 230 to perform the one or more assigned tasks.

In some examples, the one or more mobile device processors 210 may be configured to facilitate selection of a response to the one or more prompts indicative of validation of the availability of the machine 230 to perform the one or more tasks or denial of the availability of the machine 230 to perform the one or more tasks. In some examples, the one or more prompts may be associated with an interface for the person 214 to communicate one or more signals to the worksite controller 120 via the communication system 116, via the one or more networks 124, for example, upon entry of information by the person 214 via the mobile device 208 in response to the one or more prompts, for example, via a touchscreen or other user input device associated with the mobile device 208.

In some examples, for example, as shown in FIG. 2, the one or more mobile device processors 210 may be configured to cause an availability signal indicative of the validation or the denial of the availability of the machine 230 to perform the one or more tasks to be communicated via the transmitter/receiver 216 to the worksite controller 120, for example, via the communication system 116 via the one or more networks 124. In some examples, the one or more worksite controller processors 200 may be configured to receive the availability signal and display, via an output device 232 (e.g., a display device in communication with the one or more worksite controller processors 200) an availability image 234 indicative of the validation or the denial of availability of the machine 230 to perform the one or more tasks. For example, if the availability signal is indicative of a validation of the availability of the machine 230 to perform the one or more tasks, the availability image 234 may include a confirmation image 236 indicative that the machine 230 is available to perform the one or more tasks. On the other hand, if the availability signal is indicative of a denial of the availability of the machine 230 to perform the one or more tasks, the availability image 234 may include a denial image 238 indicative that the machine 230 is not available to perform the one or more tasks. In some examples, if the availability signal is indicative of a denial of the availability of the machine 230 to perform the one or more tasks, the one or more worksite controller processors 200 and/or the one or more mobile device processors 210 may be configured to generate a signal indicative of a cause of a denial of the availability of the machine to perform the task, and the availability image 234 may include a cause for denial image 240 indicative of the cause of the denial of availability (e.g., the machine 230 is in use, the worksite 100 includes obstructions preventing operation of the machine 230, and/or the machine 230 is not in a condition to perform the one or more tasks).

In some examples, as shown in FIG. 2, if the availability signal is indicative of a denial of the availability of the machine 230 to perform the one or more tasks due to the condition of the machine 230 being deficient, one or more of the worksite controller processors 200 and/or one or more of the mobile device processors 210 may be configured to generate a maintenance order 242 indicative that the machine 230 should be scheduled for service. In some examples, the maintenance order may be communicated to an on-site service center and/or an off-site service center, for example, via the communication system 216, for example, via the one or more networks 124.

Figure 3:
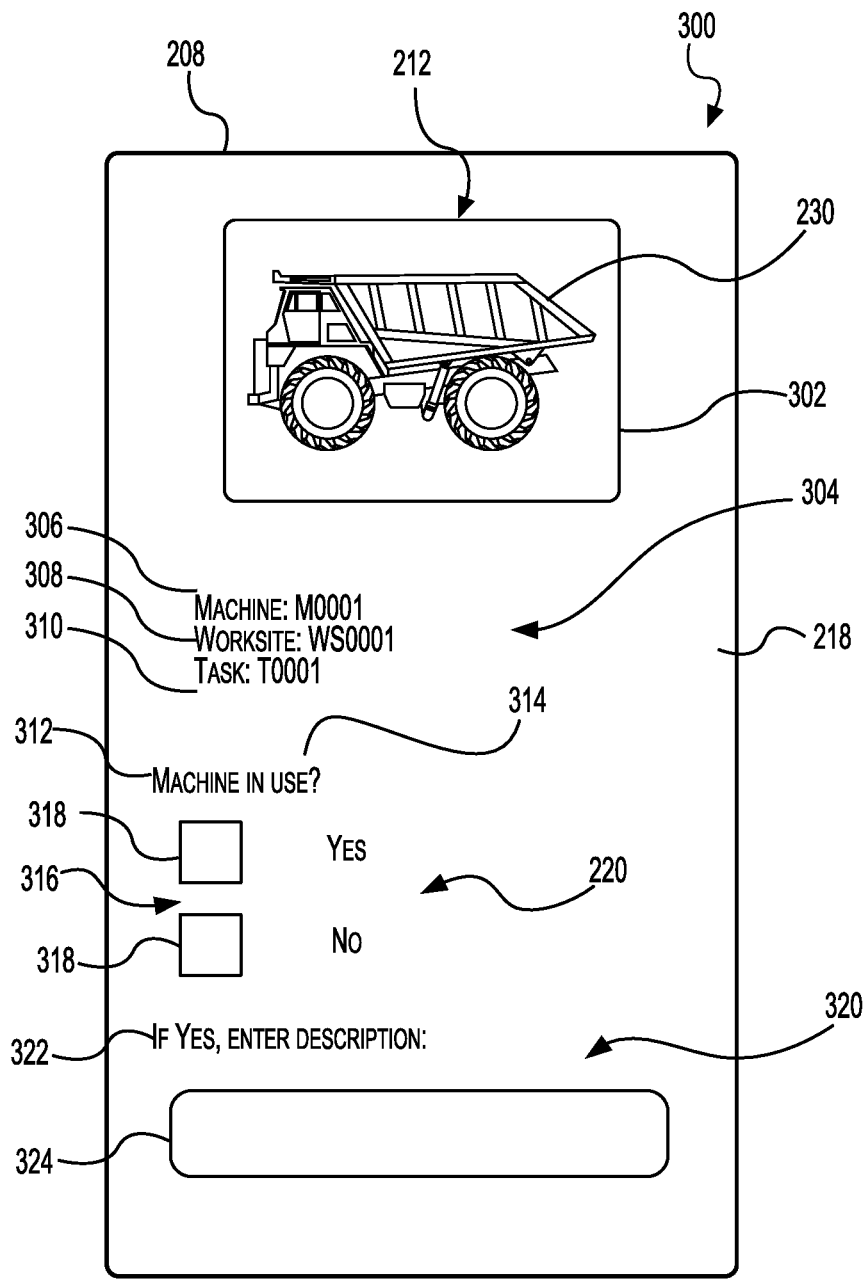
FIG. 3 illustrates an example mobile device displaying an example user interface (UI) for validating the availability of a machine to perform a task at a worksite.

FIG. 3 illustrates an example mobile device 208 displaying an example user interface (UI) 300 for validating the availability of a machine to perform a task at a worksite. In the example shown in FIG. 3, the UI 300 is displayed by the mobile device display 218 and provides an example machine status prompt 220 configured to facilitate validation by a person 214 located at the worksite 100 (e.g., at a LOS location) that a machine is not currently in use and therefore available to perform an assigned task at the worksite 100. As shown in FIG. 3, the example UI 300 displays an image 212 representative of a machine 230 (e.g., a hauling machine 112). For example, the image 212 may include a machine image 302 representative of the type of machine the person 214 will be validating, which may provide the person 214 with a visual cue about the type of machine. In some examples, the machine image 302 may be a picture or other depiction of the machine itself, although other types of visual depictions of the machine 230 for validation are contemplated.

As shown in FIG. 3, the machine status prompt 220 may also include a task field 304 configured to display an image representative information related to the task assigned to the machine 230. For example, the task field 304 may include information, such as a machine identifier 306 associated with the machine 230 (e.g., a code associated with the machine 230 ("MACHINE: M0001")), a worksite identifier 308 associated with the worksite 100 (e.g., a code associated with the worksite ("WORKSITE: WS0001")), and/or a task identifier 310 (e.g., a code associated with the task assigned to the machine 230 ("TASK: T0001")).

As shown in FIG. 3, the machine status prompt 220 may also include a query field 312 configured to provide the person 214 with an ability to indicate whether the machine 230 is in use and is unavailable to perform the assigned task. The example query field 312 shown in FIG. 3 displays a query 314 (e.g., "MACHINE IN USE?") and a response field 316 (e.g., "YES" or "NO") configured to provide the person 214 with the ability to respond to the query 314. In the example shown, the response field 316 includes boxes 318 for the person to select in response to the query 314. For example, the mobile device display 218 may be or include a touch-sensitive screen facilitating entry of the person's 214 response (e.g., by tapping the touch-sensitive screen at the appropriate box 318). In some examples, the UI 300 may also include a description field 320 configured to provide the person 214 with an ability to report any information related to the current use of the machine 230, which may be useful for a person assisting with management of the worksite 100. In the example shown, the description field 320 may provide a description prompt 322 (e.g., "IF YES, ENTER DESCRIPTION:") and a text-entry field 324, which, in some examples, when tapped by the person 214, causes a keyboard display to appear and facilitate text entry of the description by the person 214. In some examples, upon selection of "YES" in the response field 316, the description field 322 may automatically be displayed. Other forms of the machine status prompt 220 are contemplated, such as, for example, an audio prompt, and other types of mobile device 208 are contemplated. Other modes of entry of responses to the machine status prompt 220 are contemplated in response to the machine status prompt 220, such as, for example, a voice-entry mode.

Figure 4:
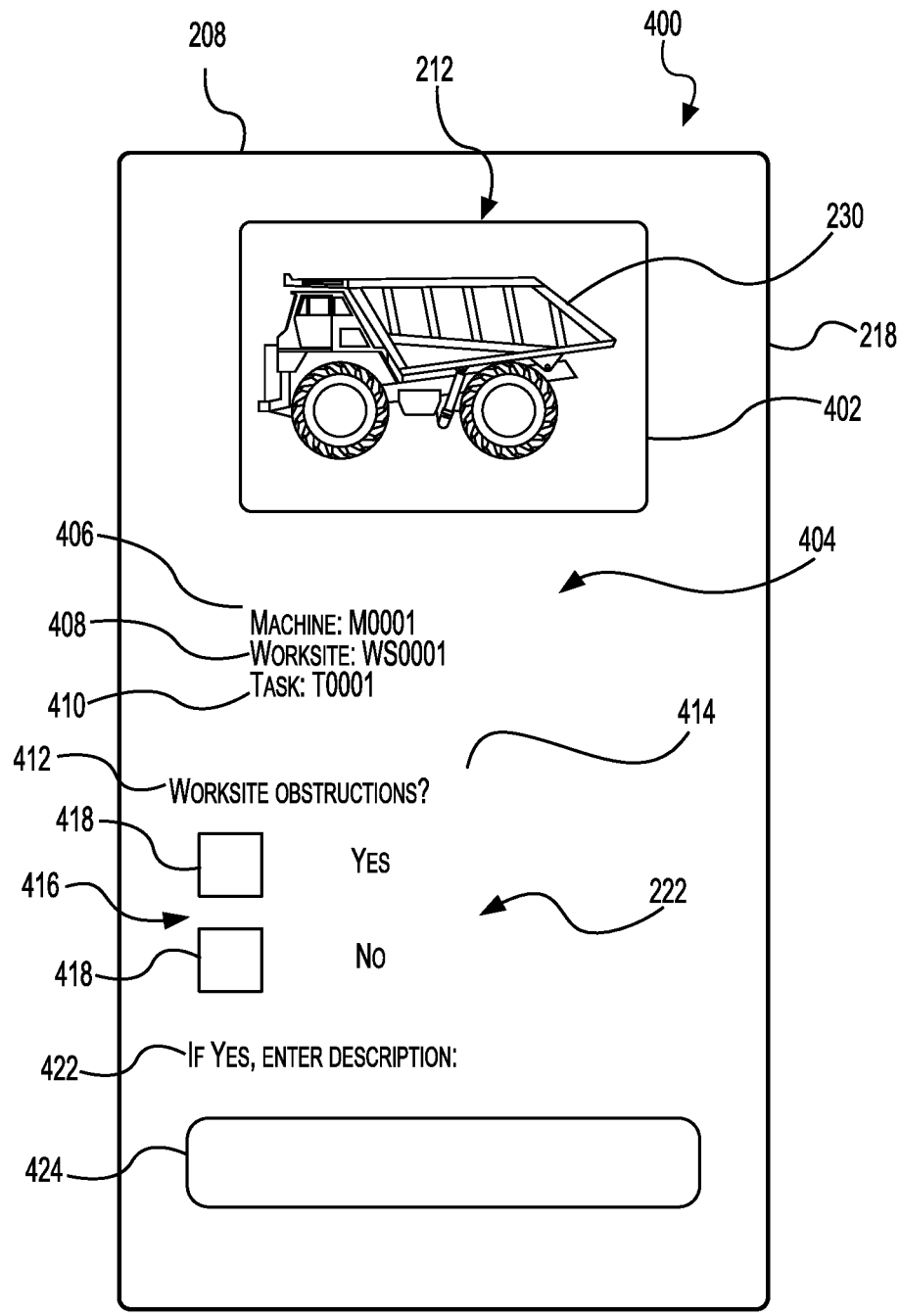
FIG. 4 illustrates an example mobile device displaying an example UI for validating the availability of a machine to perform a task at a worksite.

In some examples, if the person 214 responds "No" to the query 314, the worksite management system 102 (e.g., the worksite controller 120) may cause display of the worksite condition prompt 222 and/or the machine condition prompt 224. FIG. 4 illustrates an example mobile device 208 displaying an example user interface (UI) 400 for validating the availability of a machine to perform a task at a worksite.

In the example shown in FIG. 4, the UI 400 is displayed by the mobile device display 218 and provides an example worksite condition prompt 222 configured to facilitate validation by a person 214 located at the worksite 100 that no obstructions preventing operation of the machine 230 are present at the worksite 100, and therefore the machine 230 is available to perform an assigned task at the worksite 100. As shown in FIG. 4, the example UI 400 displays an image 212 representative of a machine 230 (e.g., a hauling machine 112). For example, the image 212 may include a machine image 402 representative of the type of machine the person 214 will be validating, which may provide the person 214 with a visual cue about the type of machine. In some examples, the machine image 402 may be a picture or other depiction of the machine itself, although other types of visual depictions of the machine 230 for validation are contemplated.

As shown in FIG. 4, similar in some examples to the example UI 300 shown in FIG. 3, the worksite condition prompt 222 may include a task field 404 configured to display an image representative information related to the task assigned to the machine 230. For example, the task field 404 may include information, such as a machine identifier 406 associated with the machine 230 (e.g., a code associated with the machine 230 ("MACHINE: M0001")), a worksite identifier 408 associated with the worksite 100 (e.g., a code associated with the worksite ("WORKSITE: WS0001")), and/or a task identifier 410 (e.g., a code associated with the task assigned to the machine 230 ("TASK: T0001")).

As shown in FIG. 4, the worksite condition prompt 222 may also include a query field 412 configured to provide the person 214 with an ability to indicate whether there are any obstructions and/or other conditions at the worksite 100 that would prevent the machine 230 from performing the assigned task. The example query field 412 shown in FIG. 4 displays a query 414 (e.g., "WORKSITE OBSTRUCTIONS?") and a response field 416 (e.g., "YES" or "NO") configured to provide the person 214 with the ability to respond to the query 414. In the example shown, the response field 416 includes boxes 418 for the person to select in response to the query 414. For example, the mobile device display 218 may be or include a touch-sensitive screen facilitating entry of the person's 214 response (e.g., by tapping the touch-sensitive screen at the appropriate box 418). In some examples, the UI 400 may also include a description field 420 configured to provide the person 214 with an ability to report any information related to the condition of the worksite 100, which may be useful for a person assisting with management of the worksite 100. In the example shown, the description field 420 may provide a description prompt 422 (e.g., "IF YES, ENTER DESCRIPTION:") and a text-entry field 424, which, in some examples, when tapped by the person 214, causes a keyboard display to appear and facilitate text entry of the description by the person 214. In some examples, upon selection of "YES" in the response field 416, the description field 422 may automatically be displayed. Other forms of the worksite condition prompt 222 are contemplated, such as, for example, an audio prompt, and other types of mobile device 208 are contemplated. Other modes of entry of responses to the worksite condition prompt 222 are contemplated in response to the worksite condition prompt 222, such as, for example, a voice-entry mode.

Figure 5:
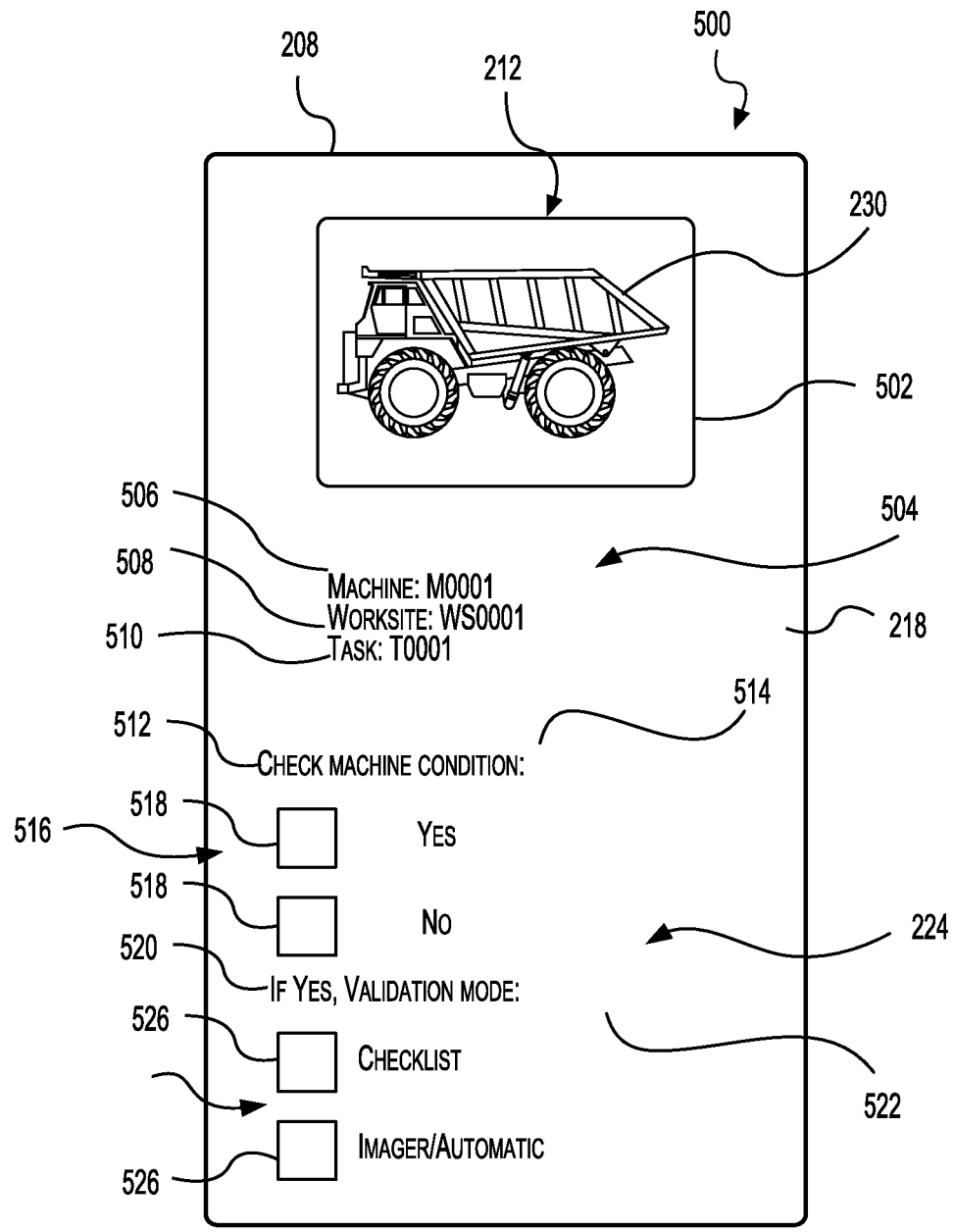
FIG. 5 illustrates an example mobile device displaying an example UI for validating the availability of a machine to perform a task at a worksite.

In some examples, if the person 214 responds "No" to the query 414, the worksite management system 102 (e.g., the worksite controller 120) may cause display of the machine status prompt 220 and/or the machine condition prompt 224. FIG. 5 illustrates an example mobile device 208 displaying an example user interface (UI) 500 for validating the availability of a machine to perform a task at a worksite. In the example shown in FIG. 5, the UI 500 is displayed by the mobile device display 218 and provides an example machine condition prompt 224 configured to facilitate validation by a person 214 located at the worksite 100 that the machine is in a condition appropriate for completing the assigned task, and therefore the machine 230 is available to perform an assigned task at the worksite 100. As shown in FIG. 5, the example UI 500 displays an image 212 representative of a machine 230 (e.g., a hauling machine 112). For example, the image 212 may include a machine image 502 representative of the type of machine the person 214 will be validating, which may provide the person 214 with a visual cue about the type of machine. In some examples, the machine image 502 may be a picture or other depiction of the machine itself, although other types of visual depictions of the machine 230 for validation are contemplated.

As shown in FIG. 5, similar in some examples to the example UIs 300 and 400 shown in FIGS. 3 and 4, the machine condition prompt 224 may include a task field 504 configured to display an image representative information related to the task assigned to the machine 230. For example, the task field 504 may include information, such as a machine identifier 506 associated with the machine 230 (e.g., a code associated with the machine 230 ("MACHINE: M0001")), a worksite identifier 508 associated with the worksite 100 (e.g., a code associated with the worksite ("WORKSITE: WS0001")), and/or a task identifier 510 (e.g., a code associated with the task assigned to the machine 230 ("TASK: T0001")).

As shown in FIG. 5, the machine condition prompt 224 may also include a query field 512 configured to provide the person 214 with an ability to indicate whether the person 214 would like to check the condition of the machine 230 in order to validate whether the machine 230 is able to perform the assigned task. The example query field 512 shown in FIG. 5 displays a query 514 (e.g., "CHECK MACHINE CONDITION?") and a response field 516 (e.g., "YES" or "NO") configured to provide the person 214 with the ability to respond to the query 514. In the example shown, the response field 516 includes boxes 518 for the person to select in response to the query 514. For example, the mobile device display 218 may be or include a touch-sensitive screen facilitating entry of the person's 214 response (e.g., by tapping the touch-sensitive screen at the appropriate box 518).

In some examples, the UI 500 may also include a validation mode field 520 configured to provide the person 214 with an ability to select between a checklist mode and an imager/automatic mode to perform a condition check of the machine 230 to validate its availability to perform the assigned task. For example, if the person selects "YES" in response to the query 514, an indication of a desire to perform the condition check, some examples of the UI 500 may display a validation mode field 520. In some examples, upon selection of "YES" in the response field 516, the validation mode field 520 may be automatically be displayed. Other forms of the machine condition prompt 224 are contemplated, such as, for example, an audio prompt, and other types of mobile device 208 are contemplated. Other modes of entry of responses to the machine condition prompt 224 are contemplated in response to the machine condition prompt 224, such as, for example, a voice-entry mode.

In the example shown in FIG. 5, the validation mode field 520 displays a validation selection mode prompt 522 (e.g., "IF YES, VALIDATION MODE:") and a validation mode response field 524 (e.g., "CHECKLIST" or "IMAGER/AUTOMATIC") configured to provide the person 214 with the ability to respond to the validation selection mode prompt 522 by selecting to perform the condition check either manually using a checklist or at least partially automatically using an imager, which, in some examples, may be incorporated into the mobile device 208. For example, some examples of the machine condition prompt 224 allow the person 214 to select between responding to the machine condition prompt 224 via a checklist of machine condition parameters for validation by the person 214 and/or via the imager prompt 228 prompting the person 214 to generate a plurality of images of one or more of a plurality of the parts of the machine 230 or portions of an environment in which the machine 230 sits. In some examples, a combination the checklist 226 and the imager prompt 228 may be used to perform the validation. For example, the validation mode response field 524 displays two validation selection modes: "CHECKLIST" and "IMAGER/AUTOMATIC" and includes corresponding boxes 526 for the person 214 to select a validation mode for performing the machine condition validation.

Figure 6:
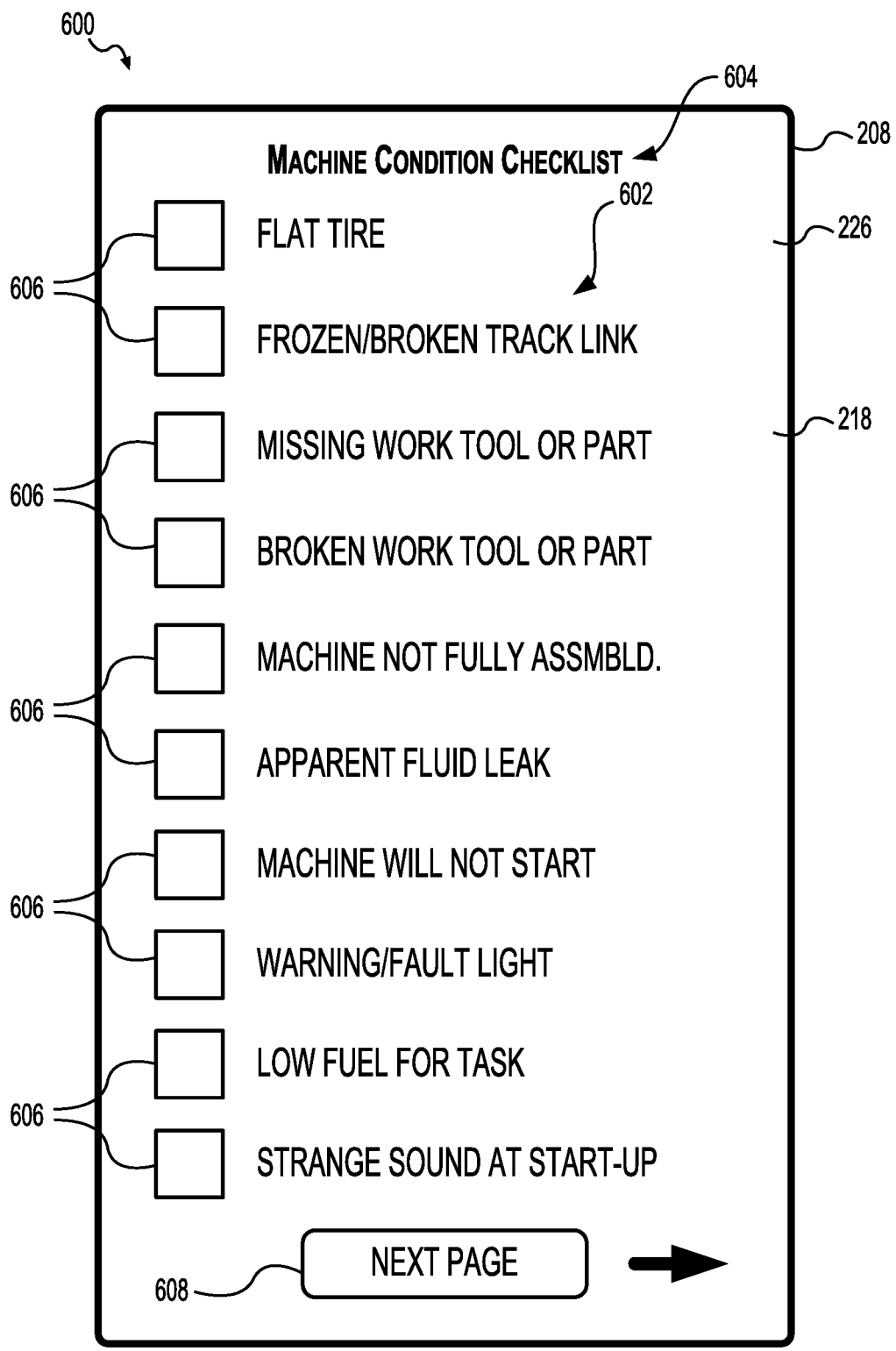
FIG. 6 illustrates an example mobile device displaying an example UI for prompting a person to use an example checklist for validating the availability of a machine to perform a task at a worksite.

If the person 214 performing the validation selects the "CHECKLIST" mode, in some examples, the mobile device 208 will display a checklist 226 for performing the machine condition validation. For example, FIG. 6 shows an example user interface (UI) 600 including an example checklist 226 of machine condition parameters 602 for validation by the person 214 (e.g., a person at a LOS location). The example UI 600 shown in FIG. 6 includes a banner field 604 identifying the checklist 226 as the "MACHINE CONDITION CHECKLIST." Associated with (e.g., adjacent to) each of the machine condition parameters 602, the example UI 600 includes a response box 606 for providing the person 214 with the ability to identify problems associated with the machine 230 according to each of the machine condition parameters 602.

The example UI 600 shown in FIG. 6 includes the following example machine condition parameters 602: "FLAT TIRE" (e.g., for identifying one or more flat tires or tires appearing to be underinflated), "FROZEN/BROKEN TRACK LINK" (e.g., for identifying apparent problems with one or more tracks of a tracklaying machine), "MISSING TOOL OR PART" (e.g., for identifying that the machine lacks the correct work tool to perform the assigned task and/or that the machine is missing a part), "BROKEN WORK TOOL OR PART" (e.g., for identifying that the machine has broken parts), "MACHINE NOT FULLY ASSMBLD" (e.g., for identifying that the machine is at least partially unassembled (e.g., the correct work tool is not attached), "APPARENT FLUID LEAK" (e.g., for identifying that the machine has an apparent fuel leak, coolant leak, oil leak, hydraulic fluid leak, etc.), "MACHINE WILL NOT START" (e.g., for identifying that the machine will not start), "WARNING/FAULT LIGHT" (e.g., for identifying that a warning or fault light is illuminated on the operator interface once activated), "LOW FUEL FOR TASK" (e.g., for identifying that the machine lacks sufficient fuel for completing the assigned task and needs additional fuel), and "STRANGE SOUND AT START-UP" (e.g., for identifying that the machine is making a sound indicative of a problem needing correction prior to use). The example list of machine condition parameters 602 shown in FIG. 6 merely provides an example of a possible list, and in other embodiments of the disclosed invention, additional or different machine condition parameters 602 may be displayed via interface 600. In some examples, one or more of the machine condition parameters 602 may be automatically generated, for example, based at least in part on the type of machine and/or other factors (e.g., the service or maintenance history of the machine and/or other machines of the same or similar type and/or manufacturer).

Figure 7:
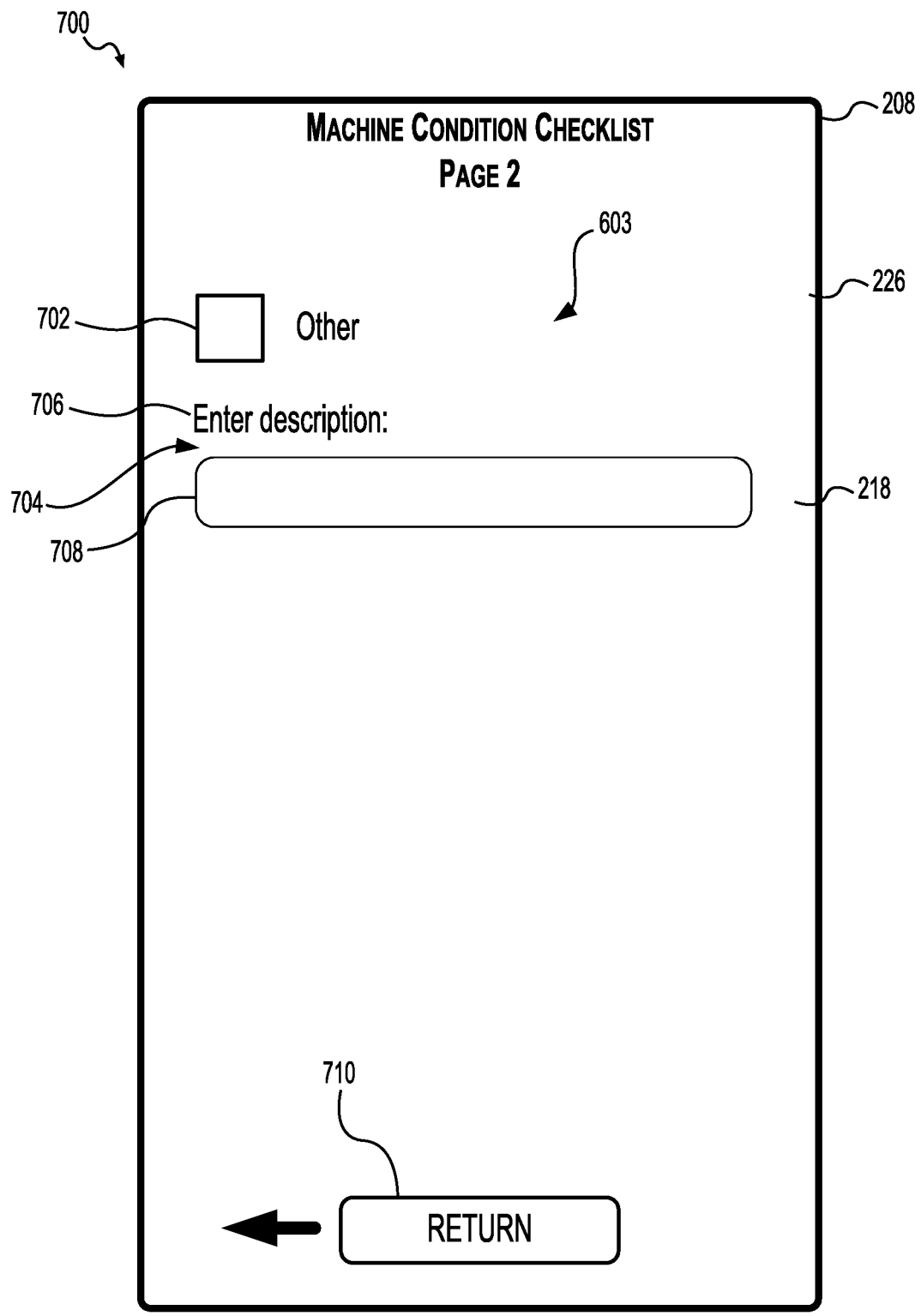
FIG. 7 illustrates an example mobile device displaying another page of the example UI shown in FIG. 6.

The example UI 600 shown in FIG. 6 also include an advance selector 608 button (e.g., "NEXT PAGE") configured to provide the person 214 with display of additional checklist UI screens including additional machine condition parameters 603. For example, FIG. 7 is an example user interface (UI) 700 providing an additional page of the checklist 226 for providing additional machine condition parameters 603. In the example shown in FIG. 7, the UI 700 lists an "Other" prompt machine condition parameter 603 for providing the person 214 with an option of describing a fault with the machine 230 that is not covered by the machine condition parameters 602 on UI 600. A check box 702 associated with the "Other" machine condition parameter option is displayed on UI 700. For example, the mobile device display 218 may be or include a touch-sensitive screen facilitating entry of the person's 214 response (e.g., by tapping the touch-sensitive screen at the box 702). In some examples, the UI 700 may also include a description field 704 configured to provide the person 214 with an ability to report a description of the "Other" problem associated with the machine 230 that may prevent the machine 230 from performing the assigned task, which may be useful for a person assisting with management of the worksite 100. In the example shown, the description field 704 provides a description prompt 706 (e.g., "Enter description:") and a text-entry field 708, which, in some examples, when tapped by the person 214, causes a keyboard display to appear and facilitate text entry of the description by the person 214. In some examples, upon selection of "Other," option via check box 702, the description field 706 may automatically be displayed. The example UI 700 shown in FIG. 7 also includes a return selector button 710 (e.g., "RETURN") configured to provide the person 214 with display of a previous checklist UI screen (e.g., the example UI 600 shown in FIG. 6).

Figure 8:
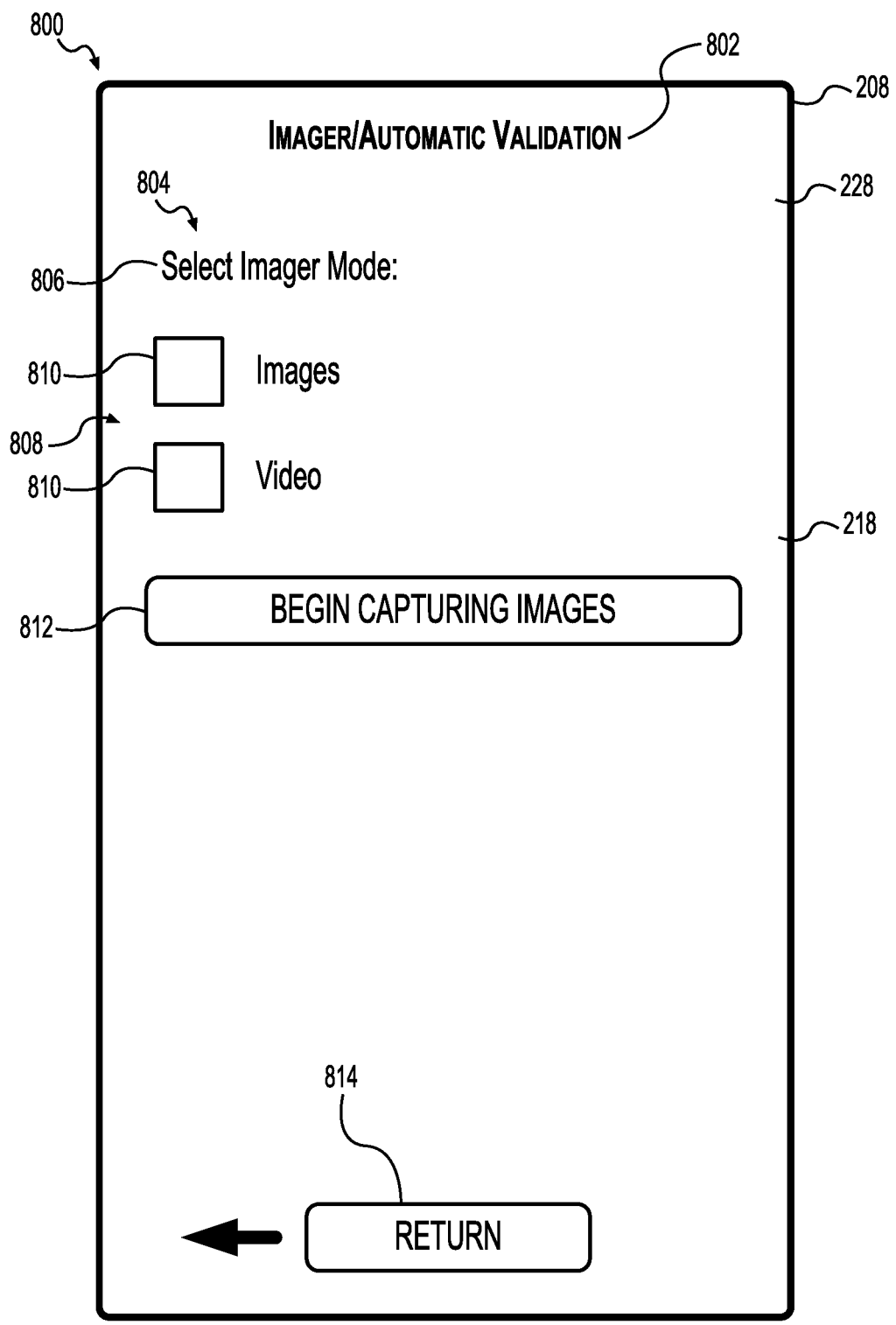
FIG. 8 illustrates an example mobile device displaying an example UI for prompting a person to select between example imager modes for at least partially automatic validation of the availability of a machine to perform a task at a worksite using an imager.

Referring to FIG. 5, if the person 214 performing the validation selects the "IMAGER/AUTOMATIC" mode in the example UI 500, in some examples, the mobile device 208 may be configured to display an imager prompt 228 for performing the machine condition validation. For example, FIG. 8 shows an example user interface (UI) 800 including a banner field 802 identifying the UI 800 as an "IMAGER/AUTOMATIC VALIDATION" prompt. The example UI 800 also includes an imager type selection field 804 configured to display an imager type selection prompt 806 configured to provide the person 214 with the ability to select to perform the condition check using an imager configured to provide discrete images associated with the condition of the machine 230 or a video-capable imager configured to provide video images associated with the condition of the machine 230. For example, the imager type selection field 804 may include an imager type response field 808 configured to display two imager types: "Images" and "Video" and includes corresponding boxes 810 for the person 214 to select the imager type. In some examples, a combination of images and video may be selected.

As shown in FIG. 8, the example UI 800 also includes a start button 812 configured to permit the person 214 to begin capturing images of the machine 230 and the surroundings (e.g., the ground under the machine 230 to check for apparent fluid leaks). For example, the start button 812 shown in FIG. 8 provides an example prompt "BEGIN CAPTURING IMAGES," which the person 214 may select and thereafter begin capturing the one or more images. In some examples, upon activation of the start button 812, the mobile device 208 may be configured to provide guidance to the person 214 capturing the one or more images, such as, for example, the parts of the machine 230 (e.g., similar to the checklist 226) and/or the ground under the machine 230, for example, to identify potential fluid leaks. In some examples, the one or more mobile device processors 210 and/or the one or more worksite controller processors 200 may be configured to automatically interpret the one or more captured images, for example, using known computer-executed image classification and/or analysis techniques. The example UI 800 shown in FIG. 8 also includes a return selector button 814 (e.g., "RETURN") configured to provide the person 214 with display of a previous checklist UI screen (e.g., the example UI 500 shown in FIG. 5).

In some examples, the interaction between the person 214 and the example UIs 300-800 may be communicated (e.g., via the transmitter/receiver 216 of the mobile device 208) via the communication system 116 and/or via the one or more networks 124 to the worksite controller 120. The worksite controller 120 may be configured to display via the output device 232 one or more images indicative of any of the aspects and/or information of the interaction between the person 214 and the UIs 300-800, including, for example, the availability image 234.

Figure 9:
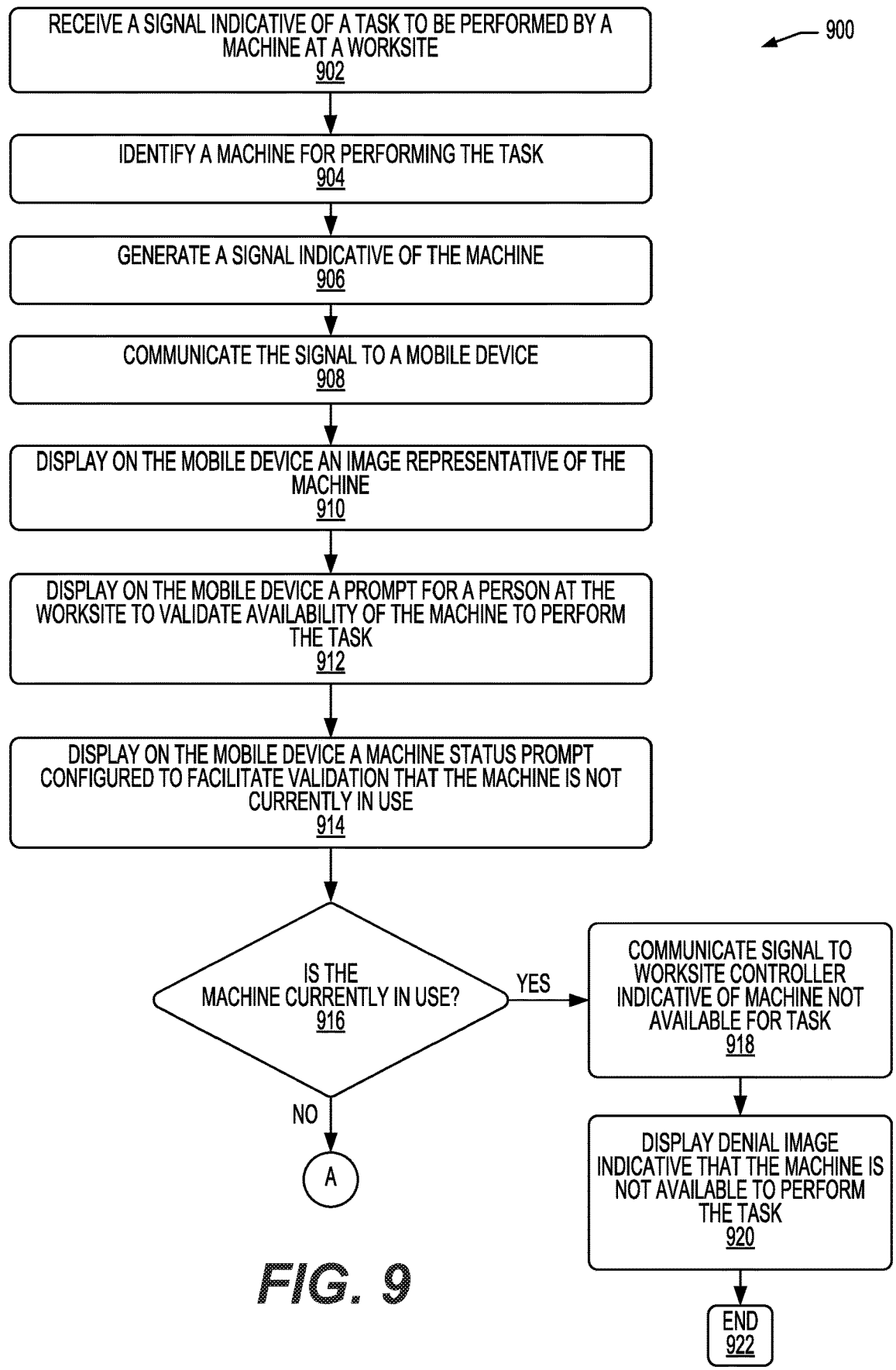
FIG. 9 illustrates an example a first portion of a process for validating the availability of a machine for performing a task at a worksite.

FIG. 9 illustrates an example process 900 for validating the availability of a machine for performing a task associated with a worksite. This process is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 9 illustrates a flow diagram of an example process 900 for validating the availability of a machine for performing a task associated with a worksite. The example process 900, at 902, may include receiving a signal indicative of a task to be performed by a machine at a worksite. For example, a worksite management system may be configured to assist with developing and/or executing a worksite plan that may be used to guide operation of one or more machines at the worksite. In some examples, the worksite management system may provide an interface for a human manager to select a machine for performing a selected task associated with the worksite, for example, according to the worksite plan. The machine may be manually controlled, semi-autonomous, fully-autonomous, and/or remotely controlled. In some examples, the worksite may be remotely located from the human manager. For example, the human manager may be operating from a non-line-of-site (NLOS) location, as described herein. The signal indicative of a task to be performed by a machine may be communicated via a communication system to a mobile device located at the worksite and may be used to by a person at the worksite to validate the availability of the machine to perform the assigned task, for example, as described herein.

The example process 900, at 904, may identify a machine for performing the task, for example, based at least in part on the signal indicative of the task to be performed by the machine at the worksite. For example, the human manager at the interface of the worksite management system may select one or more machines for performing the task based at least in part on a list of machines at the worksite that may be available to perform the task. In some examples, the human manager may use the worksite management system to select the one or more machines for performing the task.

At 906, in some examples, the process 900 may generate a signal indicative of the machine, for example, the one or more machines selected by the human manager. In some examples, the worksite management system may be configured to generate the signal.

The example process 900, at 908, may include communicating the signal indicative of the machine to a mobile device, for example, located at the worksite. For example, the worksite management system may communicate the signal indicative of the machine via a communication system, for example, via one or more networks, to the mobile device. In some examples, the mobile device may be used by a person at the worksite (e.g., at a LOS location) to validate the availability of the one or more machines to perform the assigned task associated with the worksite, for example, as described herein.

In some examples, at 910, the process 900 may include displaying on the mobile device an image representative of the machine. For example, the mobile device may include a display, and the display may be configured to indicate information related to the machine, such as information that may be used to identify the machine, for example, as described herein.

At 912, the example process 900 may include displaying on the mobile device a prompt for a person at the worksite to validate the availability of the machine to perform the task. For example, the mobile device may be configured to display via a user interface an interactive display configured to prompt the person to validate the availability of the machine to perform the assigned task.

The example process 900, at 914, may include displaying on the mobile device a machine status prompt configured to facilitate validation that the machine is not currently in use. For example, the machine status prompt may include an interactive user interface configured to cause the person at the worksite to verify that the machine selected to perform that task is not currently performing a different task that would prevent it from performing the assigned task, for example, as described herein.

At 916, the example process 900 may include determining whether the machine is currently in use. For example, the person at the worksite may determine whether the machine is already in use. If, at 916, the person at the worksite determines that the machine is not currently in use, the process 900 may advance to step 1022, as shown in and described in conjunction with FIG. 10. Alternatively, if at 918, the person at the worksite determines that the machine is currently in use and thus unavailable to perform the assigned task, the example process may include communicating a signal to the worksite controller indicative that the machine not available for performing the assigned task. For example, the person at the worksite may use the mobile device, in response to the machine status prompt, to enter an indication that the machine is currently in use, thereby generating a signal indicative that the machine is currently in use, which may be communicated to the worksite controller.

The example process 900 may end at 922, after displaying a denial image indicative that the machine is not available to perform the task at step 920, for example, as described herein. For example, the worksite management system may include an output device, such as a display for displaying the denial image. The denial image may be viewed by the human manager located remotely from the worksite, and the human manager, based on the unavailability of the machine, may select another machine for performing the task.

Figure 10:
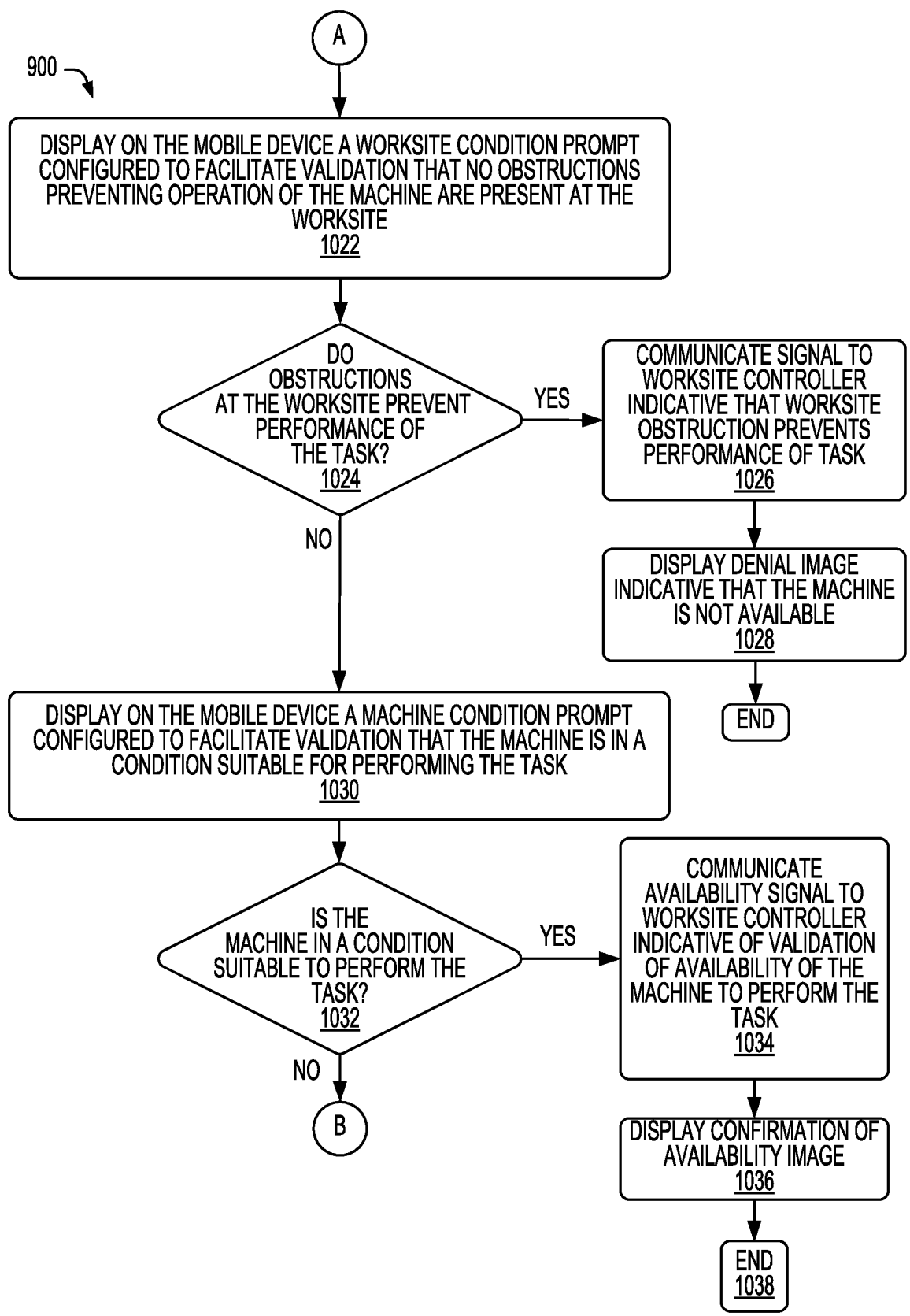
FIG. 10 illustrates an example a second portion of the process for validating the availability of a machine for performing a task at a worksite.

Alternatively, in some examples, if the person at the worksite verifies that the machine is not currently being used to perform another task, then process 900 may conduct a worksite condition evaluation as shown in FIG. 10. Referring now to step 1022, the example process 900 may include displaying on the mobile device a worksite condition prompt configured to facilitate validation that no obstructions preventing operation of the machine are present at the worksite. For example, the worksite status prompt may include an interactive user interface configured to cause the person at the worksite to verify that there are no obstructions or similar reasons associated with the worksite that would prevent the machine from performing (e.g., safely performing) the assigned task at the worksite, for example, as described herein.

At 1024, the example process 900 may include determining whether the there are any obstructions or other similar reasons associated with the worksite that would prevent the machine from performing the assigned task. For example, the person at the worksite may determine whether any such obstruction or reasons exist.

At 1026, if the person at the worksite determines that such obstructions exist at the worksite, the example process 900 may include communicating a signal to the worksite controller indicative that a worksite obstruction prevents the machine from performance of the assigned task. For example, the person at the worksite may use the mobile device, in response to the worksite status prompt, to enter an indication that there is an obstruction at the worksite that would prevent the machine from performing the assigned task, thereby generating a signal indicative that an obstruction exists, which may be communicated to the worksite controller.

The example process 900, at 1028, may include displaying a denial image indicative that there is an obstruction at the worksite that prevents the machine from performing the assigned task, for example, as described herein. For example, the output device of the worksite management system may display the denial image. The denial image may be viewed by the human manager located remotely from the worksite, and the human manager, based on the unavailability of the machine, may select another machine for performing the task. Thereafter, in some examples, the example process 900 may end.

At 1030, if the person at the worksite verifies that the worksite does not include any obstructions preventing the machine from performing the assigned task, the example process 900 may include displaying on the mobile device a machine condition prompt configured to facilitate validation that the machine is in a condition suitable for performing the assigned task, for example, as described herein. For example, the machine condition prompt may include an interactive user interface configured to cause the person at the worksite to verify that the machine is in a condition suitable for performing the assigned task, for example, as described herein.

At 1032, the example process 900 may include determining whether the machine in a condition suitable to perform the assigned task. For example, the person at the worksite may determine whether the machine is in a suitable condition. If the person at the worksite verifies at 1032 that the machine is not in a condition suitable for performing the assigned task, then the example process 900 progresses to 1138 shown and described in conjunction with FIG. 11. However, if the person at the worksite verifies at 1034 that the machine is in a suitable condition for performing the assigned task, the example process 900 may include communicating an availability signal to worksite controller indicative of validation of availability of the machine to perform the assigned task. For example, the person at the worksite may use the mobile device, in response to the machine condition prompt, to enter an indication that the machine is in a suitable condition to perform the assigned task, thereby generating a signal indicative that the machine is in a suitable condition, which may be communicated to the worksite controller.

The example process 900 may end at 1038 after displaying a confirmation of availability image at 1036 if the person at the worksite verifies that the machine is in a suitable condition for performing the assigned task. For example, the output device of the worksite management system may display the confirmation of availability image. The confirmation of availability image may be viewed by the human manager located remotely from the worksite, and the human manager, based on the availability of the machine, may, in some examples, initiate performance of the assigned task by the machine.

Figure 11:
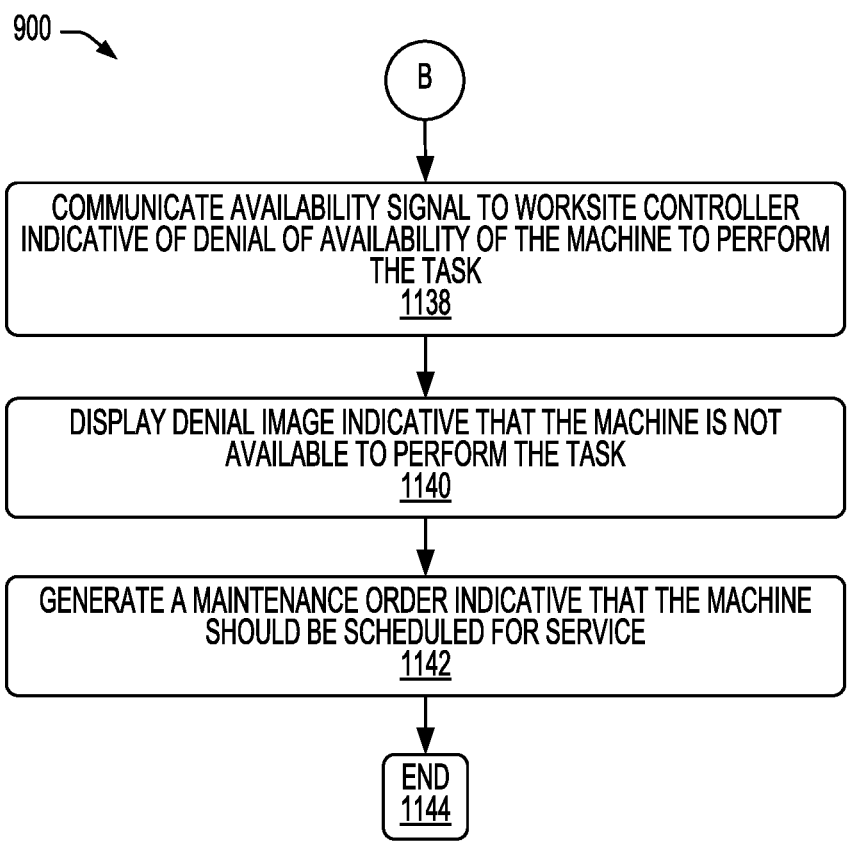
FIG. 11 illustrates an example a third portion of the process for validating the availability of a machine for performing a task at a worksite.

Now referring to FIG. 11, at 1138, if the person at the worksite finds that the machine is not in a condition suitable for performing the assigned task, the example process 900 may include communicating an availability signal to worksite controller indicative of denial of availability of the machine to perform the assigned task. For example, the person at the worksite may use the mobile device, in response to the machine condition prompt, to enter an indication that there is a problem associated with the condition of the machine that would prevent the machine from performing the assigned task, thereby generating a signal indicative that the machine is not in a condition suitable for performing the assigned task, which may be communicated to the worksite controller, for example, as described herein.

At 1140, based at least in part on the availability signal indicative of denial of the availability of the machine to perform the assigned task, the example process 900 may include displaying a denial image indicative that there is a problem with the condition of the machine that prevents the machine from performing the assigned task, for example, as described herein. For example, the output device of the worksite management system may display the denial image. The denial image may be viewed by the human manager located remotely from the worksite, and the human manager, based on the unavailability of the machine, may select another machine for performing the task. In some examples, the denial image may include comments about the condition of the machine preventing its availability to perform the assigned task.

In some examples, based at least in part on the availability signal indicative of denial of the availability of the machine to perform the task, the example process 900 may conclude at 1144 after generating a maintenance order indicative that the machine should be scheduled for service at 1142. In some examples, such maintenance orders may be communicated to a service or maintenance location, for example, so that the service may be performed.

INDUSTRIAL APPLICABILITY

As noted herein, a worksite plan may be developed and used to guide operators and/or machines managing, executing, and completing a number of tasks outlined within a worksite plan to achieve a desired result associated with the worksite. The worksite plan may include instructions for particular machines to perform corresponding tasks in a particular order to achieve a desired result at the worksite. However, in some examples, a worksite manager making decisions about assigning machines to perform particular tasks associated with a worksite plan may be at an NLOS location relative to the worksite, and thus, may not be able to verify that one or more of the machines are actually available to perform the assigned tasks.

In an alternate example of the disclosed invention, a validation search may be conducted prior to receiving information regarding a task assigned to be performed by a machine. In some such examples, a walk-around inspection may be performed by a person in close proximity with the machine (e.g., a LOS location) to determine whether any machine-related faults and/or any worksite-related faults are associated with the machine that might prevent the machine from being able to successfully perform the assigned task. Resultantly, the status of such machines may be updated based on the results of the conducted walk-around inspection. Accordingly, even before identifying or determining which task to be performed, a list may be generated, including, for example, identification of a given machine, a status associated with the given machine, and/or a time duration of the status of the given machine. Advantageously, a manager of the worksite, who may be at an NLOS location relative to the worksite, may plan implementation of future tasks based at least in part on the generated list. This may assist the manager to assign appropriate equipment to perform a task, for example, in an appropriate location and/or during an appropriate time slot.

Factors pertaining to machine environment may determine whether a given machine is available for performing a given task. For example, one or more of the machines assigned to perform a respective task may be unavailable to perform the assigned task because, for example, the machine is already being operated to perform a different task and is thus currently unavailable to perform the assigned task. In some examples, one or more of the machines assigned to perform a respective task may be unavailable to perform the task because, for example, the assigned machine is not in a condition suitable to perform the assigned task. For example, the assigned machine may not have a work tool coupled to the machine appropriate for performing the assigned task. For example, the assigned task may include breaking-up rock or concrete, which may require a work tool including a hydraulic hammer. The assigned machine may be fitted with another work tool or bucket, and thus, the machine may need to be refitted with a hydraulic hammer before it will be able to perform the assigned task. In some examples, the assigned machine may not be available for performing the assigned task because it needs to be serviced or repaired before it will be able to perform the assigned task. For example, the assigned machine may have a flat tire, a frozen or broken tack link, a missing work tool or part, a broken work tool or part, the assigned machine is not fully assembled (e.g., the work tool is not properly attached), there are apparent fluid leaks (e.g., fuel, hydraulic fluid, oil, and/or coolant leaks are apparent from the ground under the machine and/or on machine (e.g., fluid running down the side)), the machine is unable to start, there are warning lights/fault signals at machine's operator controls, the machine does not have sufficient fuel to perform the assigned task, and/or the machine makes a strange sound at start-up.

Likewise, factors pertaining to worksite environment may determine whether a given machine is available for performing a given task. In some examples, one or more of the machines assigned to perform a respective task may be unavailable to perform the task because, for example, there is an obstruction on the worksite that will prevent the assigned machine from performing the task. For example, the obstruction may include one or more other machines either parked or operating at a location that prevents the assigned machine from being able to perform the respective task. In some examples, the obstructions may include environmental obstacles, such as, for example, trees, a steep drop-off in the terrain, and/or some other obstacle may prevent safe operation of the assigned machine to perform the assigned task.

The systems and methods, in at least some examples described herein, may be configured to validate the availability of a particular machine to perform an assigned task. In some examples, the systems and methods may be configured to provide a person located at the worksite with the ability to validate the availability (or determine a lack of availability) of a machine selected from, for example, an NLOS location relative to the worksite to perform an assigned task. In some examples, the systems and methods may include a mobile device for use by a person at the worksite to validate the availability, for example, that may include an interactive user interface configured to provide one or more prompts for facilitating the validation by the person and communicating the validation to a location remote from the worksite, such as, for example, the location of a worksite manager, for example, as described herein.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A worksite management system comprising:
    a worksite controller comprising one or more worksite controller processors configured to:
        receive a signal indicative of an autonomously-performed task to be performed by an autonomously-capable machine at a worksite;
        identify whether the autonomously-capable machine is available for performing the autonomous task based on a nexus between a nature of the autonomous task and one or more work tools equipped to the machine;
        generate a signal indicative of the autonomously-capable machine; and
        generate a control signal causing the autonomously-capable machine to perform the autonomous task; and
    a mobile device comprising one or more mobile device processors configured to:
        receive the signal indicative of the machine;

display a prompt for a person at the worksite to validate availability of the machine, a condition of the machine, and a condition of the one or more work tools equipped to the machine to perform the autonomously-performed task.

2. The system of claim 1, wherein the prompt comprises a machine status prompt configured to facilitate validation that the machine is not currently in use.

3. The system of claim 1, wherein the prompt comprises a worksite condition prompt configured to facilitate validation that no obstructions preventing operation of the machine are present at the worksite.

4. The system of claim 1, wherein the prompt comprises a machine condition prompt configured to facilitate validation that the machine is in a condition suitable for performing the autonomously-performed task, the machine condition prompt including having a list for the type of machine to be used, for confirming that the machine has a suitable tool for performing the autonomously-performed task, and for confirming a plurality of machine condition parameters.

5. The system of claim 4, wherein the machine condition prompt comprises a checklist configured to prompt the person to inspect the plurality of machine condition parameters associated with a state of readiness of a plurality of parts of the machine.

6. The system of claim 4, wherein the machine condition prompt comprises an imager prompt configured to prompt the person to generate a plurality of images of one or more of a plurality of parts of the machine or portions of an environment in which the machine sits.

7. The system of claim 1, wherein the one or more mobile device processors are further configured to:
facilitate selection of a response to a prompt indicative of one of validation of the availability of the machine to perform the autonomously-performed task or denial of the availability of the machine to perform the autonomously-performed task; and
cause an availability signal indicative of the one of the validation or the denial of the availability of the machine to perform the autonomously-performed task to be communicated to the worksite controller.

8. The system of claim 7, wherein the one or more worksite controller processors are further configured to receive the availability signal and display an availability image indicative of the one of the validation or the denial of the availability of the machine to perform the autonomously-performed task.

9. The system of claim 8, wherein at least one of the one or more worksite controller processors or the one or more mobile device processors is configured to generate a signal indicative of a cause of the denial of the availability of the machine to perform the autonomously-performed task.

10. The system of claim 9, wherein at least one of the one or more worksite controller processors or the one or more mobile device processors is configured to generate a maintenance order indicative that the machine should be scheduled for service.

11. A method for validating availability of a machine to perform a task at a worksite, the method comprising:
receiving a signal indicative of an autonomously-performed task to be performed by an autonomously-capable machine at a worksite;
identifying a machine for performing the autonomously-performed task based on a nexus between a nature of the autonomously-performed task and one or more work tools equipped to the machine;
generating a signal indicative of the machine;
communicating the signal to a mobile device;
causing a display, on the mobile device, an image representative of the autonomously-capable machine;
causing a display, on the mobile device, of a prompt for a person at the worksite to validate availability of the machine to perform the autonomously-performed task;
causing a display, on the mobile device, of a prompt for validating suitability of the one or more work tools equipped to the machine for the autonomously-performed task for the person at the worksite;
receiving a signal at a worksite controller that the autonomously-capable machine is able to perform the autonomously-performed task; and
generating a control signal causing the autonomously-capable machine to perform the autonomously-performed task.

12. The method of claim 11, wherein the prompt to validate availability of the machine comprises a display of a machine status prompt configured to facilitate validation that the machine is not currently in use.

13. The method of claim 11, further comprising causing a display of a worksite condition prompt configured to facilitate validation that no obstructions preventing operation of the machine are present at the worksite.

14. The method of claim 11, further comprising causing a display of a machine condition prompt configured to facilitate validation that the machine is in a condition suitable for performing the autonomously-performed task.

15. The method of claim 14, wherein the machine condition prompt comprises a checklist configured to prompt the person to inspect a plurality of machine condition parameters associated with a state of readiness of a plurality of parts of the machine.

16. The method of claim 14, wherein the machine condition prompt comprises an imager prompt configured to prompt the person to generate a plurality of images of one or more of a plurality of parts of the machine or portions of an environment in which the machine sits.

17. A worksite management system with a memory storing computer-executable instructions which, when executed by the worksite management system, cause the worksite management system to:
receive a signal indicative of an autonomously-performed task to be performed by an autonomously-capable machine at a worksite;
identify a machine for performing the autonomously-performed task based on a nexus between a nature of the autonomously-performed task and one or more work tools or buckets equipped to the machine;
generate a signal indicative of the machine;
communicate the signal indicative of the machine to a mobile device;
cause the mobile device to display on the mobile device an image representative of the machine;
cause the mobile device to display on the mobile device a prompt for a person at the worksite to validate availability of the machine to perform the autonomously-performed task;
cause the mobile device to display a prompt for the person at the worksite to validate a condition of the machine; and
generate a control signal to cause the autonomously-capable machine to perform the autonomously-performed task.

18. The worksite management system of claim 17, wherein displaying the prompt comprises displaying a machine status prompt configured to facilitate validation that the machine is not currently in use.

19. The worksite management system of claim 17, wherein displaying the prompt comprises displaying a worksite condition prompt configured to facilitate validation that no obstructions preventing operation of the machine are present at the worksite.

20. The worksite management system of claim 17, wherein displaying the prompt comprises displaying a machine condition prompt configured to facilitate validation that the machine is in a condition suitable for performing the autonomously-performed task.

* * * * *